(12) United States Patent
Dillon et al.

(10) Patent No.: US 11,298,572 B2
(45) Date of Patent: Apr. 12, 2022

(54) SAFETY SYSTEM WITH DIGITAL TRACKING AND REPORTING AND METHOD OF USE

(71) Applicant: Smart Harness Systems, LLC, College Station, TX (US)

(72) Inventors: James David Dillon, Liberty, TX (US); Emily Anne Brown, College Station, TX (US); Anthony Kornegay, College Station, TX (US); Adam Laubach, College Station, TX (US); Trevor Lubianski, College Station, TX (US); Reynaldo Martinez, College Station, TX (US); Richard Hayden Meeks, College Station, TX (US); Jarrett Pawelek, College Station, TX (US)

(*) Notice: Subject to any disclaimer, the term of this patent is extended or adjusted under 35 U.S.C. 154(b) by 0 days.

(21) Appl. No.: 15/986,050

(22) Filed: May 22, 2018

(65) Prior Publication Data

US 2019/0022439 A1    Jan. 24, 2019

Related U.S. Application Data

(60) Provisional application No. 62/583,295, filed on Nov. 8, 2017, provisional application No. 62/533,898, filed on Jul. 18, 2017.

(51) Int. Cl.
*A62B 35/04* (2006.01)
*A62B 35/00* (2006.01)
(Continued)

(52) U.S. Cl.
CPC ...... *A62B 35/0093* (2013.01); *A62B 35/0075* (2013.01); *G08B 21/02* (2013.01); *A62B 35/0018* (2013.01); *A62B 35/04* (2013.01); *G01C 5/00* (2013.01); *G01D 5/12* (2013.01); *G01S 11/02* (2013.01)

(58) Field of Classification Search
CPC .. A62B 35/0093; A62B 35/0075; A62B 35/04
See application file for complete search history.

(56) References Cited

U.S. PATENT DOCUMENTS 2,990,131 A * 6/1961 Carlsson ............ A62B 35/0093
                                              182/237
3,236,470 A * 2/1966 Huck ................. B65H 19/1889
                                              242/554.1
(Continued)

*Primary Examiner* — Alvin C Chin-Shue
(74) *Attorney, Agent, or Firm* — Shannon Warren

(57) ABSTRACT

A safety monitoring harness system for the protection of a climber comprising: said safety monitoring harness system comprising a base, a one or more tether assemblies, a retraction assembly, an alarm system, a strap length sensor assembly, and a power system. Said one or more tether assemblies comprising at least a first tether assembly and a second tether assembly. Said one or more tether assemblies each comprising a strap, and an anchoring hook. Said safety monitoring harness system is configured to selectively attach to said climber by: attaching a harness assembly to said climber, and securing said base to said harness assembly. A portion of said retraction assembly is enclosed within said base. Said retraction assembly are configured to selectively retract and release portions of said strap from within said base.

2 Claims, 33 Drawing Sheets

(51) Int. Cl.
*G08B 21/02* (2006.01)
*G01C 5/00* (2006.01)
*G01D 5/12* (2006.01)
*G01S 11/02* (2010.01)

(56) References Cited

U.S. PATENT DOCUMENTS

| | | | | |
|---|---|---|---|---|
| 8,253,572 | B2* | 8/2012 | Lytle, Jr. | A01K 27/004 |
| | | | | 119/771 |
| 8,325,053 | B2* | 12/2012 | Flynt | A62B 35/0025 |
| | | | | 182/231 |
| 9,852,598 | B1* | 12/2017 | Thompson | G08B 21/0446 |
| 2004/0237374 | A1* | 12/2004 | Klein | A01K 97/01 |
| | | | | 43/21.2 |
| 2007/0151805 | A1* | 7/2007 | Betcher | A62B 35/0093 |
| | | | | 182/239 |
| 2009/0078505 | A1* | 3/2009 | Casebolt | A62B 1/10 |
| | | | | 182/231 |
| 2009/0084631 | A1* | 4/2009 | Casebolt | A62B 1/10 |
| | | | | 182/235 |
| 2012/0217091 | A1* | 8/2012 | Baillargeon | G08B 21/02 |
| | | | | 182/18 |
| 2015/0027808 | A1* | 1/2015 | Baillargeon | B66F 17/006 |
| | | | | 182/3 |
| 2015/0265860 | A1* | 9/2015 | Kennedy | F16B 45/02 |
| | | | | 182/3 |
| 2016/0027279 | A1* | 1/2016 | Ulner | G08B 21/0446 |
| | | | | 340/573.1 |
| 2018/0107169 | A1* | 4/2018 | Hu | A62B 35/0043 |
| 2018/0207455 | A1* | 7/2018 | Thompson | A62B 35/0093 |

* cited by examiner

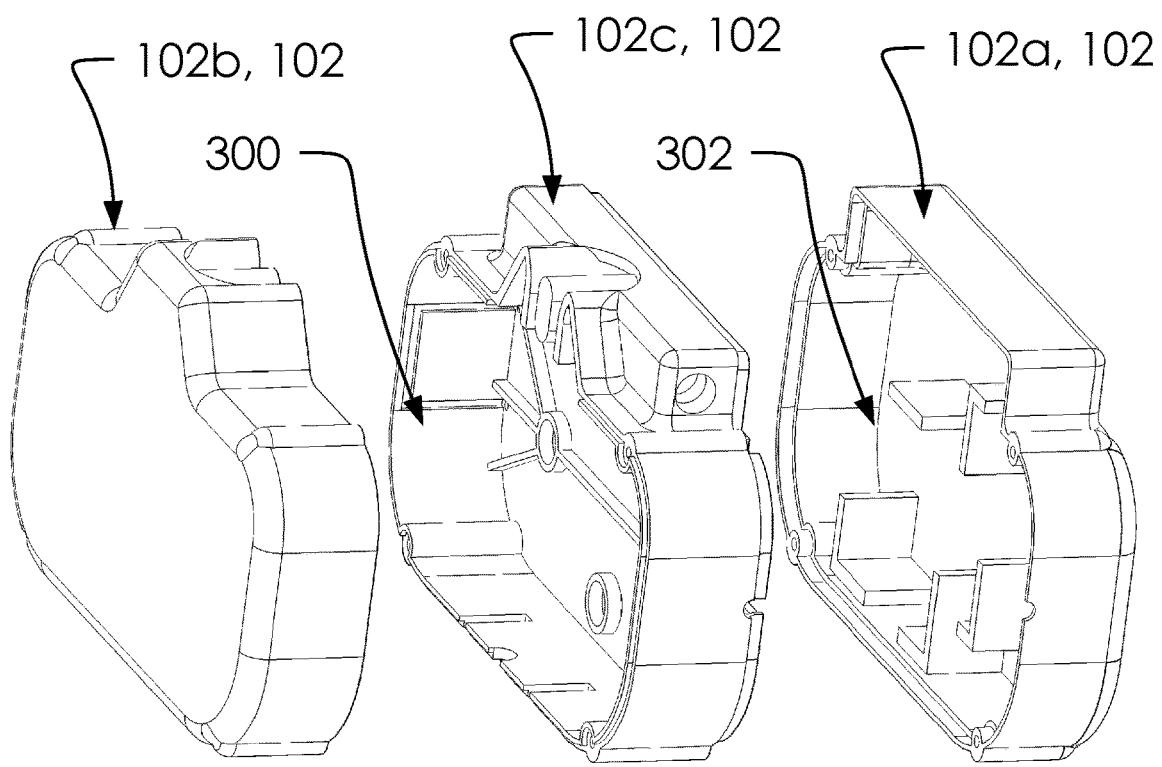
FIG. 3A
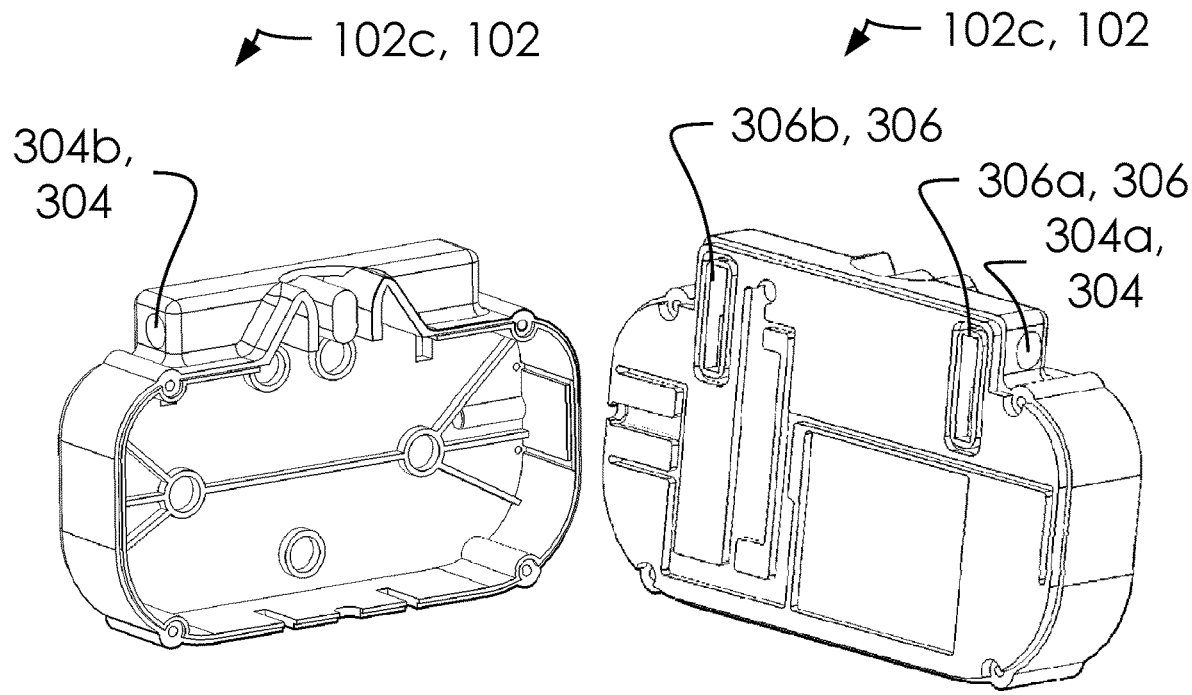
FIG. 3B
FIG. 3C

2400

|  | number of markers (2402a) | strap length (2402b) | current movement (2402c) | last movement (2402d) | number markers outside case (2402e) | absolute velocity average last minute (2402f) |
|---|---|---|---|---|---|---|
| first tether (2404a) | 24 | 5 meters | TRUE | 0 seconds | 10 | 20 cm |
| second tether (2404b) | 24 | 5 meters | FALSE | 33 seconds | 0 | 1 cm |

| BaseID (2502a) | timeReading (2502b) | timeSeconds (2502c) | timeSeconds BaseZero (1602d) | strapLengthMeters (2502e) | markersOutsideCase (2502f) |
|---|---|---|---|---|---|
| first base (2504a) | 15:27:52.0 | 00:00:00.0 | 0 | 0.4167 | 2 |
| first base (2504a) | 15:27:52.1 | 00:00:00.1 | 0.05 | 0.4412 | 3 |
| first base (2504a) | 15:27:52.2 | 00:00:00.2 | 0.1 | 0.5147 | 3 |
| first base (2504a) | 15:27:52.3 | 00:00:00.3 | 0.15 | 0.6372 | 4 |
| first base (2504a) | 15:27:52.4 | 00:00:00.4 | 0.2 | 0.8087 | 4 |
| first base (2504a) | 15:27:52.5 | 00:00:00.5 | 0.25 | 1.0292 | 5 |
| first base (2504a) | 15:27:52.5 | 00:00:00.6 | 0.3 | 1.2987 | 7 |
| first base (2504a) | 15:27:52.6 | 00:00:00.7 | 0.35 | 1.6172 | 8 |
| first base (2504a) | 15:27:52.8 | 00:00:00.8 | 0.4 | 1.9847 | 10 |
| first base (2504a) | 15:27:52.8 | 00:00:00.9 | 0.45 | 2.4012 | 12 |
| first base (2504a) | 15:27:53.0 | 00:00:01.0 | 0.5 | 2.8667 | 14 |
| first base (2504a) | 15:27:53.1 | 00:00:01.1 | 0.55 | 3.3812 | 17 |
| first base (2504a) | 15:27:53.1 | 00:00:01.2 | 0.6 | 3.9447 | 19 |
| first base (2504a) | 15:27:53.3 | 00:00:01.3 | 0.65 | 4.5572 | 22 |
| first base (2504a) | 15:27:53.3 | 00:00:01.4 | 0.7 | 5.0000 | 24 |
| first base (2504a) | 15:27:53.5 | 00:00:01.5 | 0.75 | 5.0000 | 24 |
| first base (2504a) | 15:27:53.6 | 00:00:01.6 | 0.8 | 5.0000 | 24 |
| first base (2504a) | 15:27:53.7 | 00:00:01.7 | 0.85 | 5.0000 | 24 |
| first base (2504a) | 15:27:53.8 | 00:00:01.8 | 0.9 | 5.0000 | 24 |
FIG. 25A
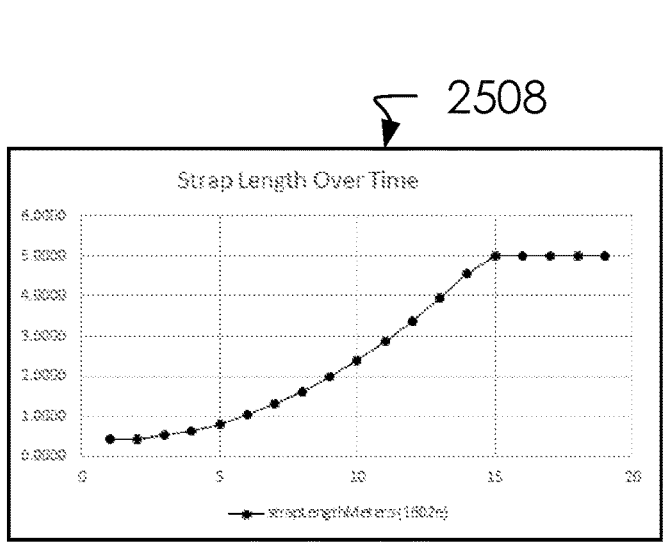
FIG. 25B
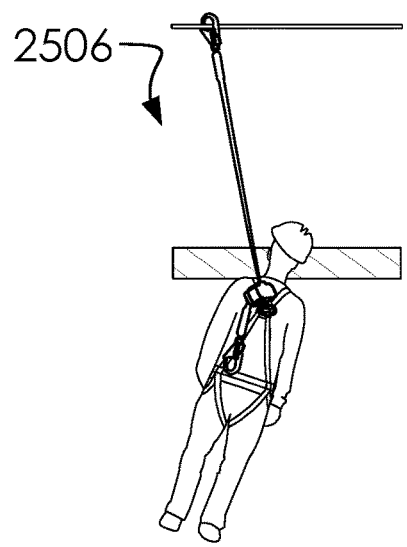
FIG. 25C

2600

| UserID 2602 | Location 2604 | TimeUp 2606 | PercentTiedoff 2608 | CurrentStatus 2610 |
|---|---|---|---|---|
| first climber 2612a | Up | 1.5 hours | 1 | Safe |
| second climber 2612b | Up | 0.2 hours | 1 | Safe |
| third climber 2612c | Ground | 0 hours | N/A | Safe |
| fourth climber 2612d | Hanging | 2.1 hours | 0.97 | Safe - Fall Event |

FIG. 26

| UserID 2702 | first tether status 2704 | seceond tether status 2706 | safety status 2708 | eventTime 2710 | statePeriod 2714 |
|---|---|---|---|---|---|
| first climber 2712a | On | Off | Safe | 13:18:20 | .81 |
| first climber 2712a | Off | On | Safe | 13:18:20 | .80.2 |
| first climber 2712a | On | Off | Safe | 13:18:20 | .80.6 |
| first climber 2712a | Off | Off | Not Safe | 13:18:20 | .80.3 |
| first climber 2712a | Off | On | Safe | 13:18:20 | .80.5 |
| first climber 2712a | On | Off | Safe | 13:18:20 | .80.4 |

FIG. 27

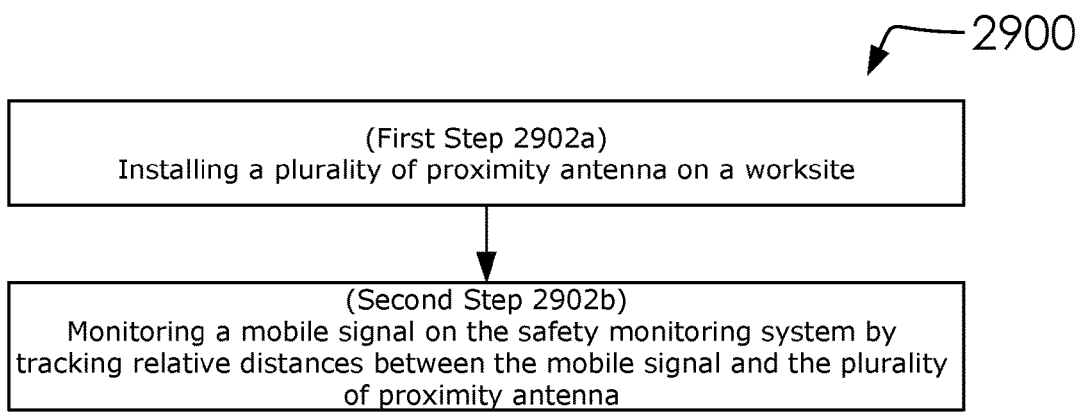
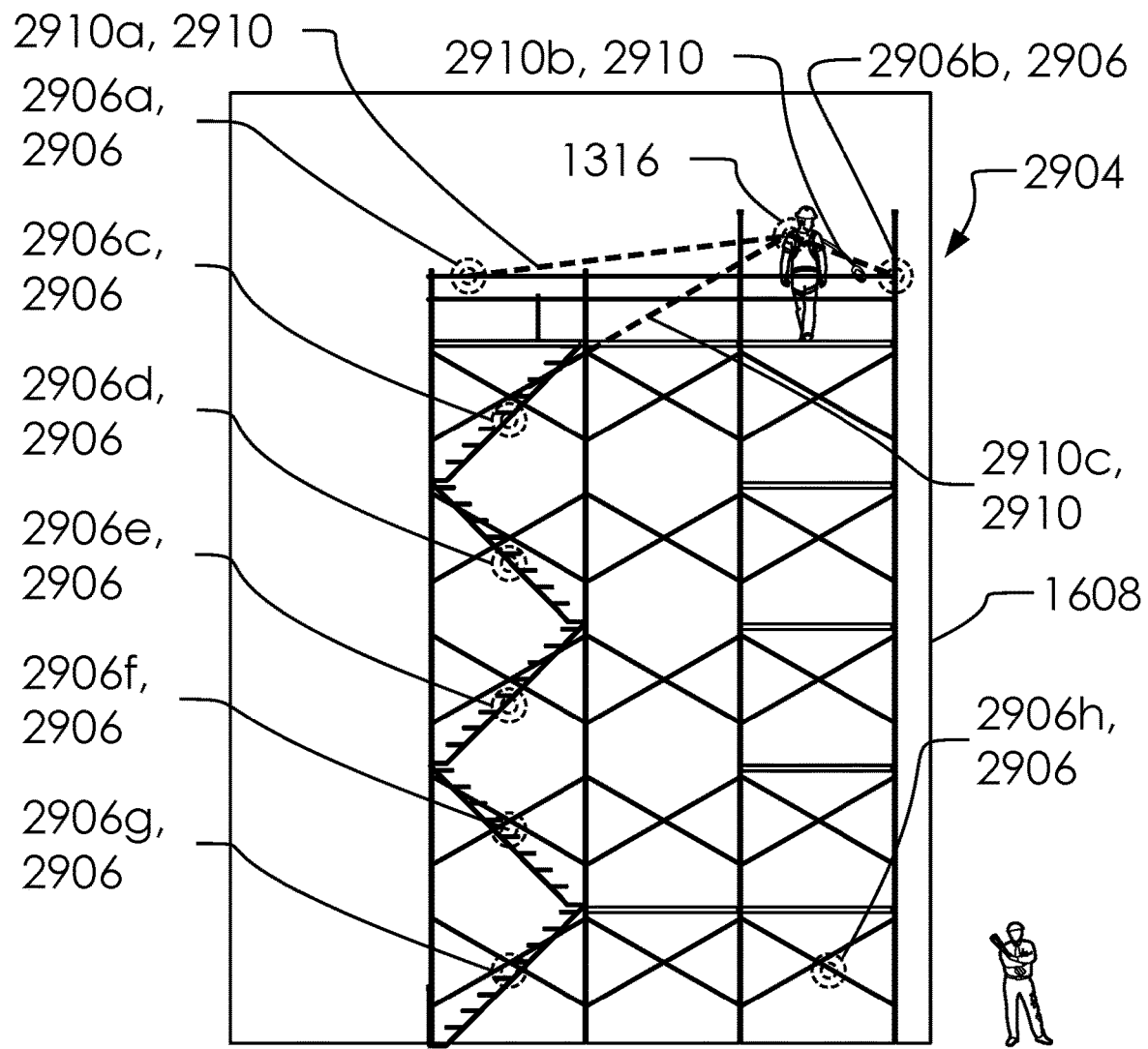

SAFETY SYSTEM WITH DIGITAL TRACKING AND REPORTING AND METHOD OF USE

CROSS-REFERENCE TO RELATED APPLICATIONS

This application claims benefit to US Patent Application Nos. 62/533,898 filed on Jul. 18, 2017 and 62/583,295 filed on Nov. 8, 2017.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

Prior art known to the Applicant includes US20150276521A1, US20140323271A1, US20150265860A1, US20120217091A1, US20110103558A1, US20110090079A1, U.S. Pat. No. 8,325,053B2, and U.S. Pat. No. 9,480,866B2

None of the known inventions and patents, taken either singularly or in combination, is seen to describe the instant disclosure as claimed.

BRIEF SUMMARY OF THE INVENTION

A safety monitoring harness system for the protection of a climber comprising: said safety monitoring harness system comprising a base, a one or more tether assemblies, a retraction assembly, an alarm system, a strap length sensor assembly, and a power system. Said one or more tether assemblies comprising at least a first tether assembly and a second tether assembly. Said one or more tether assemblies each comprising a strap, and an anchoring hook. Said safety monitoring harness system is configured to selectively attach to said climber by: attaching a harness assembly to said climber, and securing said base to said harness assembly. A portion of said retraction assembly is enclosed within said base. Said retraction assembly are configured to selectively retract and release portions of said strap from within said base. Said base tracks the position of said one or more tether assemblies by measuring portions of said strap inside and outside of said base. Said anchoring hook selectively retract and extend between a plurality of lengths. Said plurality of lengths comprise at least a retracted length and a fully extended length. Said anchoring hook are configured to selectively attach to an anchor point. Said safety monitoring harness system is configured to measure the movement of said strap by measuring movement of a plurality of strap markers relative to a one or more mag reed switches. Said safety monitoring harness system is configured to monitor use of said one or more tether assemblies by said climber by: monitoring a change in the position of said one or more tether assemblies over time, verifying that at least one among said one or more tether assemblies is extended, and verifying that at least one among said one or more tether assemblies which is extended is showing movement rather than a fixed length.

A safety monitoring harness system for the protection of a climber comprising: said safety monitoring harness system comprising a base, a one or more tether assemblies, a retraction assembly, an alarm system, a strap length sensor assembly, and a power system. Said one or more tether assemblies comprising at least a first tether assembly and a second tether assembly. Said one or more tether assemblies each comprising a strap, and an anchoring hook. Said safety monitoring harness system is configured to selectively attach to said climber by: attaching a harness assembly to said climber, and securing said base to said harness assembly. A portion of said retraction assembly is enclosed within said base. Said retraction assembly are configured to selectively retract and release portions of said strap from within said base. Said anchoring hook selectively retract and extend between a plurality of lengths. Said plurality of lengths comprise at least a retracted length and a fully extended length. Said anchoring hook of said one or more tether assemblies are configured to selectively attach to an anchor point. Said safety monitoring harness system is configured to monitor use of said one or more tether assemblies by said climber by: verifying that at least one among said one or more tether assemblies is extended.

BRIEF DESCRIPTION OF THE SEVERAL VIEWS OF THE DRAWING

FIG. 3A illustrates elevated exploded side view of case assembly 102.

FIG. 3B illustrates perspective overview of mid case portion 102c.

FIG. 3C illustrates perspective backside view of mid case portion 102c.

FIG. 12A illustrates elevated overview of retracted configuration 1200a.

FIG. 25A illustrates said tether log table 2500.

FIG. 25B illustrates said strap length chart 2508.

FIG. 25C illustrates said falling illustration 2506.

FIG. 26 illustrates said supervisor status table 2600.

FIG. 27 illustrates said climber status table 2700.

FIG. 29A illustrates said proximity sensing method 2900.

FIG. 29B illustrates an elevated front side view of proximity safety zone illustration 2904.

DETAILED DESCRIPTION OF THE INVENTION

Figure 1:
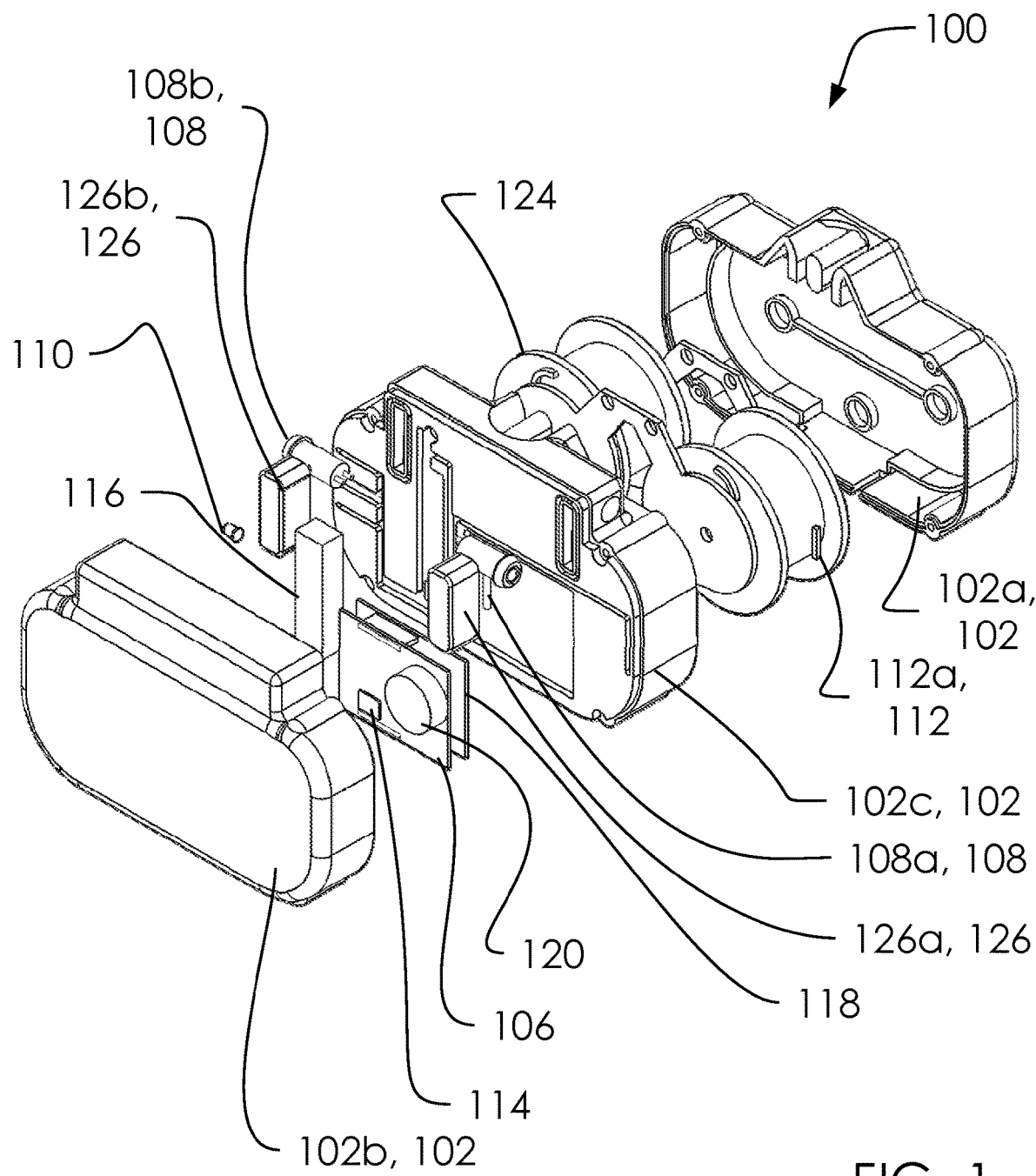
FIG. 1 illustrates perspective overview of base 100.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

These parts are illustrated in the figures and discussed below:

a base 100
a case assembly 102
a front case portion 102*a*
a rear case portion 102*b*
a mid case portion 102*c*
a PCB 106
a one or more key locks 108
a first key lock 108*a*
a second key lock 108*b*
a LED 110
a one or more mag reed switches 112
a first mag reed switch 112*a*
a second mag reed switch 112*b*
an altimeter 114
a battery assembly 116
a MSP 118
a buzzer 120
a retraction assembly 124
a one or more lock-pin enclosures 126
a first lock-pin enclosure 126*a*
a second lock-pin enclosure 126*b*
a safety monitoring harness system 200
a memory 202
a controller assembly 204
an extension detection system 206
a safe zone detection system 208
an activation system 210
an alert system 212
a processors 214
a communication hardware 216
an alarm system 218
a strap length sensor assembly 220
a position sensors 222
a locking system 224
a first cavity 300
a second cavity 302
a one or more key lock apertures 304
a first key lock aperture 304*a*
a second key lock aperture 304*b*
a one or more lock pin apertures 306
a first lock pin aperture 306*a*
a second lock pin aperture 306*b*
a two or more strap apertures 400
a first strap aperture 400*a*
a second strap aperture 400*b*
a two or more spools 402
a first spool 402*a* a second spool 402*b*
a frame 404
an aperture divider 406
a one or more pin catches 500
a first pin catch 500*a*
a second pin catch 500*b*
a plurality of configurations 502
an unlocked configuration 502*a*
a locked configuration 502*b*
a keyhole 504
a one or more cavities 506
a first cavity 506*a*
a second cavity 506*b*
a pins 508
a first pin 508*a*
a second pin 508*b*
an user 800
a harness assembly 802
a one or more tether assemblies 804
a first tether assembly 804*a*
a second tether assembly 804*b*
a leg straps 902
a first leg strap 902*a*
a second leg strap 902*b*
a shoulder straps 904
a first shoulder strap 904*a*
a second shoulder strap 904*b*
a chest strap 906
a waist strap 908
a chest buckle 910
a waist buckle 912
a leg buckles 914
a first leg buckle 914*a*
a second leg buckle 914*b*
a back attaching buckle 916
a carabiner 1004
an anchoring hook 1102
a first hook 1102*a*
a second hook 1102*b*
a strap 1106
an eye 1108
a deceleration portion 1110
a hook 1112
a clasping mechanism 1114
an extension configurations 1200
a retracted configuration 1200*a*
a second configuration 1200*b*
a fully extended configuration 1200*c*
a plurality of lengths 1202
a retracted length 1202*a*
a second length 1202*b*
a fully extended length 1202*c*
a magnetic encoded straps 1302
a GPS 1304
a ground test circuit 1306
a power system 1308
an altimeter 1310
a lock status sensors 1312
a speaker 1314
a proximity sensor system 1316
a safety monitoring method 1400
a one or more steps 1402
a first step 1402*a*
a second step 1402*b*
a length monitoring method flow chart 1404
an initial step 1406
a one or more measure length over time steps 1408
a measure length at first time step 1408*a*
a measure length at second time step 1408*b*
a verify change in length over time step 1410
a close loop step 1412
a verify length change over time step 1414
an alarm step 1416
a safety arming and monitoring method 1500
an unlocking step 1502
a receiving tether status signal step 1504
a comparing tether statuses step 1506
a verifying safe extension status step 1508
a verify one tether is extended step 1510
a verifying not static step 1512
an alarm step 1514
a clear alarm step 1516
a verify lock status step 1518
a clear alarm and close loop step 1520
a worksite 1600
a scaffolding 1602
a stairs 1604
an elevated platform 1606
a construction project 1608
a ground 1612
an unsafe zone 1614
a starting point 1616
a height 1618
a safe zone 1620
a climber 1622
a supervisor 1624
a tether configurations 1700
an unattached configuration 1700*a*
a first partially attached configuration 1700*b*
a fully attached configuration 1700*c*
a second partially attached configuration 1700*d*
an anchor point 1702
a platform 1704
a plurality of retraction stages 1800
a first retraction stage 1800*a*
a second retraction stage 1800*b*
a plurality of radial stages 1802
a first radial stage 1802*a*
a second radial stage 1802*b*
a marker interval 1804
a plurality of strap markers 1812
a fourth strap marker 18122
a first strap marker 1812*a*
a second strap marker 1812*b*
a third strap marker 1812*c*
a fifth strap marker 1812*y*
a sixth strap marker 1812*z*
a safety monitoring system 1900
a network diagram 1902
a one or more locations 1904
a first location 1904*a*
a second location 1904*b*
a third location 1904*c*
a fourth location 1904*d*
a one or more computers 1906
a first computer 1906*a*
a second computer 1906*b*
a third computer 1906*c*
a server 1908
a data storage 1910
a data storage 1910*a*
a network 1912
a printer 1914
a one or more users 1916 a first user 1916*a*
a second user 1916*b*
a third user 1916*c*
a climber 1918
an administrator 1922
a method of use 2000
a one or more steps 2002
a first step 2002*a*
a second step 2002*b*
a computers types 2100
a mobile phone 2100*a*
a personal computer 2100*b*
a tablet computer 2100*c*
a wearable computer 2100*d*
a screen 2102
a one or more input devices 2104
a keyboard 2104*a*
a trackball 2104*b*
a one or more cameras 2104*c*
a track pad 2104*d*
a data 2106
a home button 2120
an address space 2200
an address space 2200*a*
an address space 2200*d*
a processor 2202
a processor 2202*a*
a processor 2202*d*
a memory 2204
a memory 2204*a*
a memory 2204*d*
a communication hardware 2206
a communication hardware 2206*a*
a communication hardware 2206*d*
a device application 2302
a data records 2304*a*
a data records 2304*b*
a server application 2306
a tether status table 2400
a number of markers 2402*a*
a strap length 2402*b*
a current movement 2402*c*
a last movement 2402*d*
a number markers outside of case 2402*e*
an absolute velocity average last minute 2402*f*
a plurality of tethers status records 2404
a first tether status record 2404*a*
a second status record 2404*b*
a tether log table 2500
a tether record fields 2502
a tether ID field 2502*a*
a time reading field 2502*b*
a time field 2502*c*
a time base zero field 2502*d*
a strap length field 2502*e*
a markers outside field 2502*f*
an exemplary data for first tether 2504*a*
a falling illustration 2506
a strap length chart 2508
a supervisor status table 2600
an user ID field 2602
a location field 2604
a time up field 2606
a percent tied off field 2608
a current status field 2610
a one or more climbers monitored 2612
a first climbers monitored 2612*a*
a second climbers monitored 2612*b*
a third climbers monitored 2612*c*
a fourth climbers monitored 2612*d*
a climber status table 2700
an user ID field 2702
a first tether status field 2704
a second tether status field 2706
a safety status field 2708
an event time field 2710
an exemplary climber records 2712*a*
a state period field 2714
a grounding calculation method 2800
a verifying ground step 2802*a*
a grounding step 2802*a*
a grounding diagram 2804
a one or more ground paths 2806
a first ground path 2806*a*
a second ground path 2806*b*
a third ground path 2806*c*
an attachment point 2808
a ground 2810
a proximity sensing method 2900
an installing proximity antenna steps 2902*a*
a monitoring proximity steps 2902*b*
a proximity safety zone illustration 2904
a plurality of proximity antennas 2906
a first proximity antenna 2906*a*
a second proximity antenna 2906*b*
a third proximity antenna 2906*c*
a fourth proximity antenna 2906*d*
a fifth proximity antenna 2906*e*
a sixth proximity antenna 2906*f*
a seventh proximity antenna 2906*g*
an eighth proximity antenna 2906*h*
a plurality of antenna distances 2910
a first antenna distance 2910*a*
a second antenna distance 2910*b*
a third antenna distance 2910*c*
a safe zone exit 3000
a safe zone entry 3002
an entry and exit sensors 3004
an enter safe zone event 3100
a deactivate step 3104
a monitoring step 3106
an assess safety 3108
an activation step 3110
an exit safe zone event 3112
an activation step 3114
a monitoring step 3116
an assessing safety step 3118
a deactivation step 3120
a one or more side switches 3202
a first side switch 3202*a*
a second side switch 3202*b*
a third side switch 3202*c*

FIG. 1 illustrates perspective overview of base 100.

In one embodiment, said base 100 can comprise said case assembly 102, said mid case portion 102*c*, said PCB 106, said one or more key locks 108, said LED 110, said one or more mag reed switches 112, said first mag reed switch 112*a*, said second mag reed switch 112*b*, said altimeter 114, said battery assembly 116, said MSP 118, said buzzer 120, said retraction assembly 124, said retraction assembly 124 and said one or more lock-pin enclosures 126.

In one embodiment, said one or more mag reed switches 112 can comprise said first mag reed switch 112*a* and said second mag reed switch 112*b*.

In one embodiment, said case assembly 102 can comprise said front case portion 102a, said rear case portion 102b and said mid case portion 102c.

In one embodiment, said one or more key locks 108 can comprise said first key lock 108a and said second key lock 108b.

In one embodiment, said one or more lock-pin enclosures 126 can comprise said first lock-pin enclosure 126a and said second lock-pin enclosure 126b.

Said base 100 can comprise an enclosure and a plurality of components to be used in the tracking, monitoring and alerting industrial workers, such as construction crews who must tether themselves to a structure while climbing and working above the ground.

Said base 100 can comprise case assembly 102 being adapted to enclose parts 104-124, as described herein. Said mid case portion 102c can comprise a divider between said front case portion 102a and rear case portion 102b and can be useful for separating said retraction assembly 124 (a moving part) from other components within said base 100.

In one embodiment, said one or more key locks 108 can selectively lock and release said retraction assembly 124 for movement. Said one or more lock-pin enclosures 126 can be used to selectively protect portions of said one or more key locks 108.

Said PCB 106 can comprise a processor, memory, communication hardware, and other components, as is known in the art, and discussed herein.

Said LED 110 can comprise a light for communicating a status of said base 100, as is known in the art.

Said one or more mag reed switches 112 can be configured to sense changes in said retraction assembly 124, as described herein.

Figure 2:
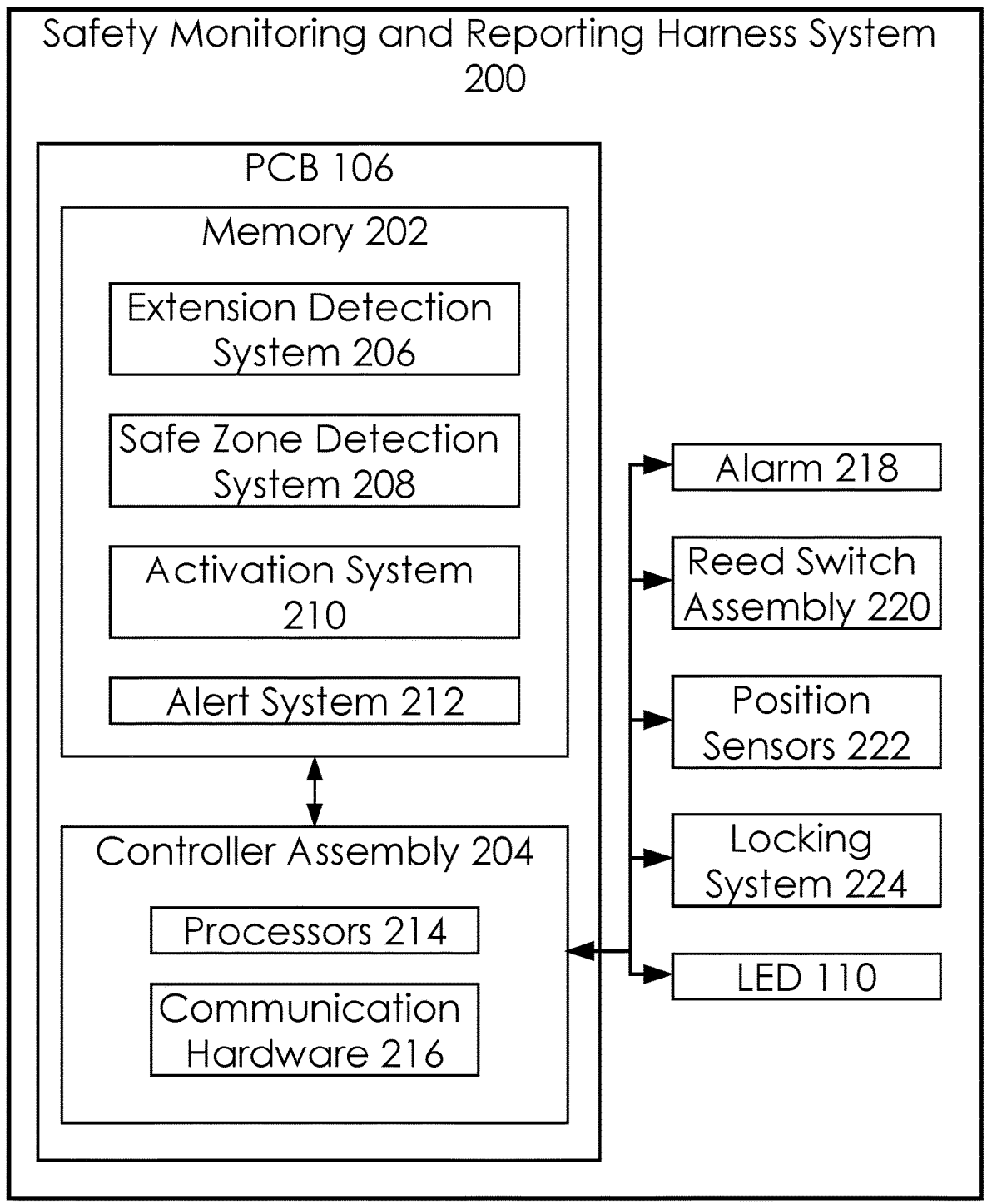
FIG. 2 illustrates block diagram of safety monitoring harness system 200.

FIG. 2 illustrates block diagram of safety monitoring harness system 200.

In one embodiment, said safety monitoring harness system 200 can comprise said memory 202, said alarm system 218, said strap length sensor assembly 220, said position sensors 222 and said locking system 224.

In one embodiment, said memory 202 can comprise said extension detection system 206, said safe zone detection system 208, said activation system 210 and said alert system 212.

In one embodiment, said controller assembly 204 can comprise said processors 214 and said communication hardware 216.

In one embodiment, said base 100 can comprise said locking system 224.

In one embodiment, said PCB 106 can comprise said controller assembly 204.

In one embodiment, said safety monitoring harness system 200 can comprise an overview of the components configured for life saving and monitoring as disclosed herein. Said safety monitoring harness system 200 can further comprise server based tracking and reporting on components within FIG. 2.

In one embodiment, said safety monitoring harness system 200 can comprise a plurality of components configured in a system-on-a-chip (said PCB 106) which can comprise said memory 202, said controller assembly 204 said position sensors 222, said alarm system 218, and so on, as is known in the art.

In one embodiment, memory 202 can comprise a plurality of software algorithms for operating said safety monitoring harness system 200, such as said extension detection system 206, safe zone detection system 208, activation system 210, and said alert system 212. In one embodiment, such programs can be configured to communicate with and collect data from said alarm system 218, strap length sensor assembly 220, position sensors 222, locking system 224 and said LED 110.

In one embodiment, said alarm system 218 can comprise an audio alarm, a vibration alarm, or similar, as is known in the art.

FIG. 3A illustrates elevated exploded side view of case assembly 102.

FIG. 3B illustrates perspective overview of mid case portion 102c.

FIG. 3C illustrates perspective backside view of mid case portion 102c.

In one embodiment, said one or more key lock apertures 304 can comprise said first key lock aperture 304a and said second key lock aperture 304b.

In one embodiment, said one or more lock pin apertures 306 can comprise said first lock pin aperture 306a and said second lock pin aperture 306b.

In one embodiment, said base 100 can comprise said second lock pin aperture 306b.

In one embodiment, said case assembly 102 can comprise said first cavity 300, said second cavity 302, said second cavity 302, said one or more key lock apertures 304, said second key lock aperture 304b and said one or more lock pin apertures 306.

In one embodiment, said first cavity 300 can comprise a space between rear case portion 102b and mid case portion 102c and can be configured to hold said battery assembly 116, LED 110, one or more lock-pin enclosures 126, portions of said one or more key locks 108, said MSP 118, said buzzer 120, said PCB 106, and said altimeter 114. Said second cavity 302 can comprise a space between said front case portion 102a and said mid case portion 102c and can be configured to hold said retraction assembly 124, said one or more mag reed switches 112 and portions of said one or more key locks 108 in a locked configuration.

Figure 4A:
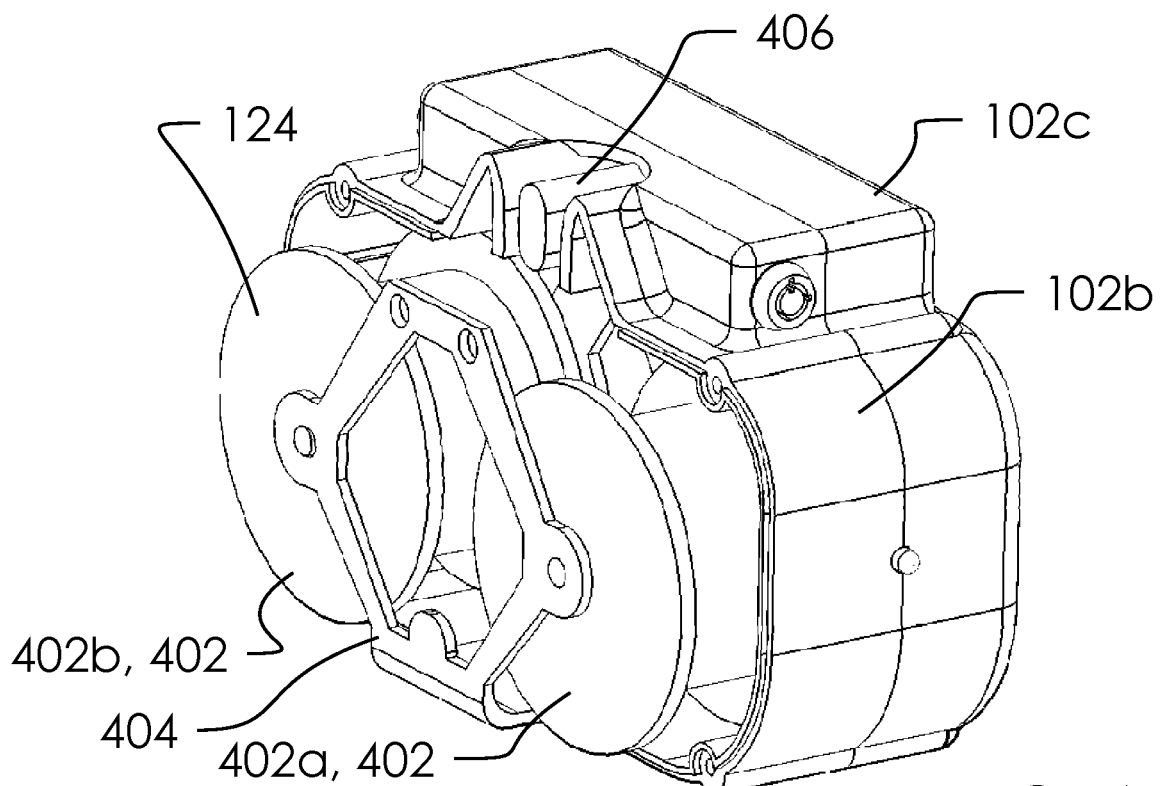
FIG. 4A illustrates a perspective overview view of retraction assembly 124.

FIG. 4A illustrates a perspective overview view of retraction assembly 124.

Figure 4B:
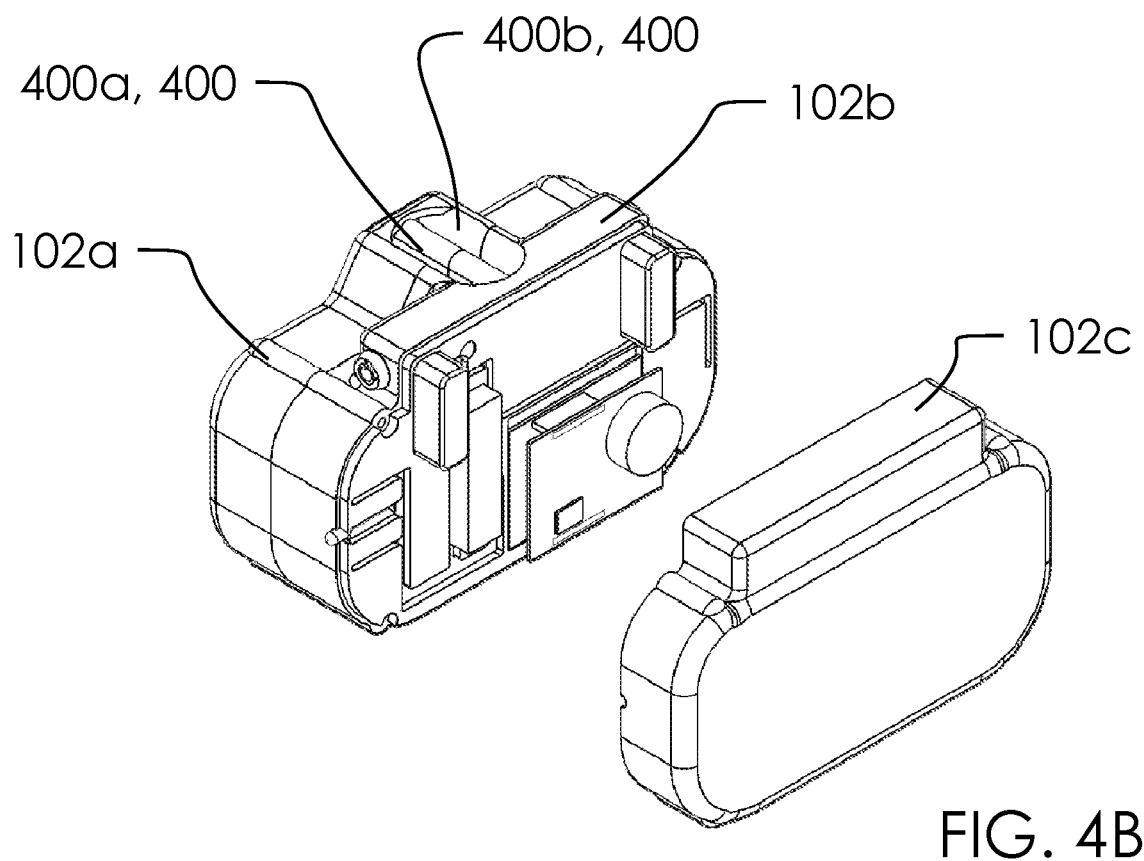
FIG. 4B illustrates a perspective overview view of case assembly 102.

FIG. 4B illustrates a perspective overview view of case assembly 102.

In one embodiment, said two or more strap apertures 400 can comprise said first strap aperture 400a, said second strap aperture 400b and said aperture divider 406.

In one embodiment, said two or more spools 402 can comprise said first spool 402a, said second spool 402b and said aperture divider 406.

In one embodiment, said base 100 can comprise said two or more strap apertures 400 and said second strap aperture 400b.

In one embodiment, said retraction assembly 124 can comprise said second strap aperture 400b, said two or more spools 402 and said frame 404.

In one embodiment, said retraction assembly 124 can be enclosed within said base 100 in said first cavity 300. In one embodiment, portions of said retraction assembly 124 can extend outside of said base 100 through said two or more strap apertures 400, as discussed herein.

In one embodiment, said aperture divider 406 can be arranged between said first strap aperture 400a and said second strap aperture 400b to ensure the straps on said two or more spools 402 do not be come entangled during operation of said base 100.

Figure 5A:
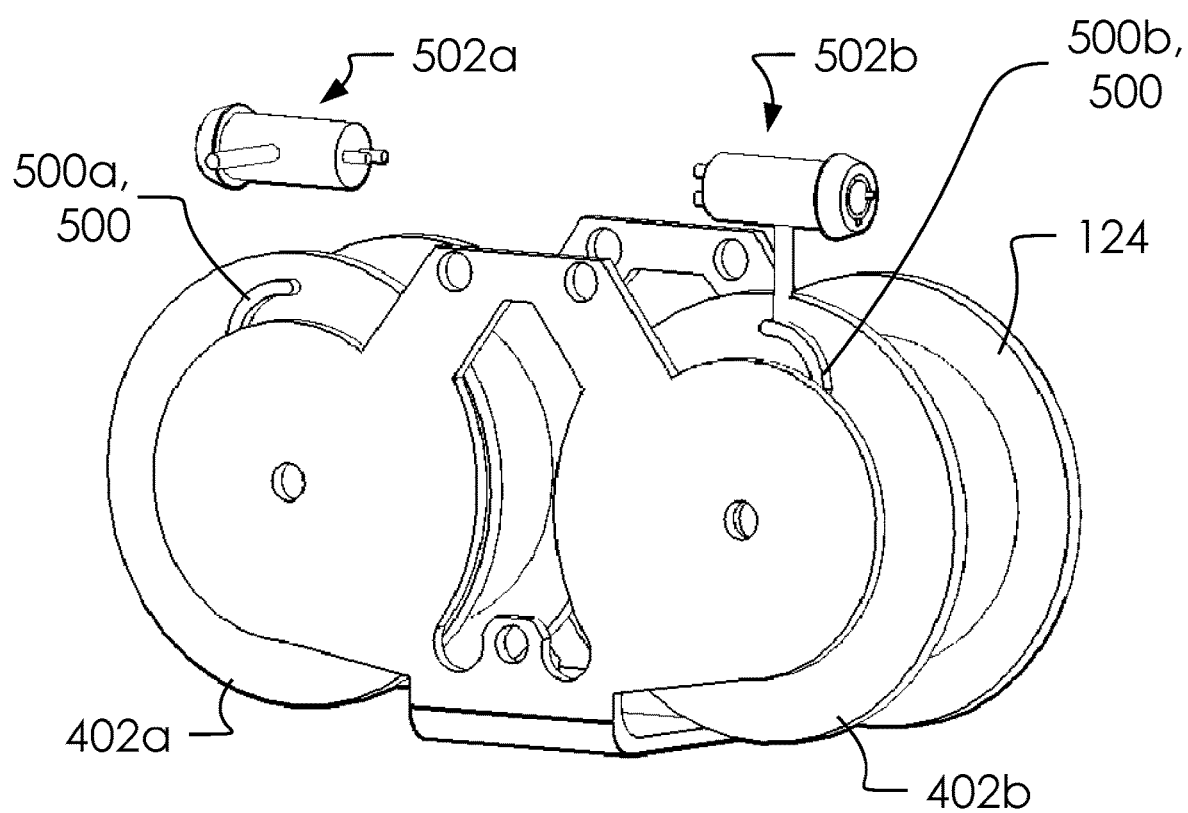
FIG. 5A illustrates perspective front view of retraction assembly 124.

FIG. 5A illustrates perspective front view of retraction assembly 124.

Figure 5B:
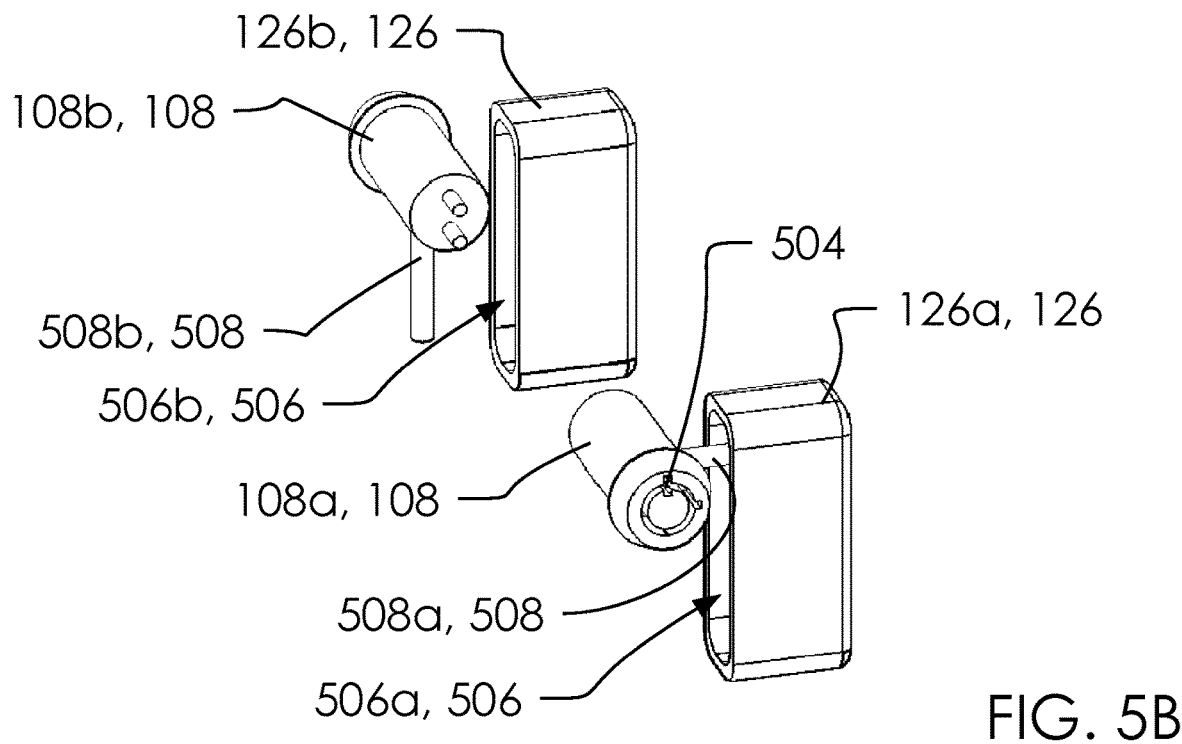
FIG. 5B illustrates perspective overview of one or more key locks 108.

FIG. 5B illustrates perspective overview of one or more key locks 108.

In one embodiment, said one or more pin catches 500 can comprise said first pin catch 500*a* and said second pin catch 500*b*.

In one embodiment, said plurality of configurations 502 can comprise said unlocked configuration 502*a* and said locked configuration 502*b*.

In one embodiment, said one or more cavities 506 can comprise said first cavity 506*a* and said second cavity 506*b*.

In one embodiment, said pins 508 can comprise said first pin 508*a* and said second pin 508*b*.

In one embodiment, said one or more key locks 108 can comprise said second pin catch 500*b*, said plurality of configurations 502, said keyhole 504, said keyhole 504 and said pins 508.

In one embodiment, said first key lock 108*a* can comprise said first pin 508*a*.

In one embodiment, said second key lock 108*b* can comprise said second pin 508*b*.

In one embodiment, said one or more lock-pin enclosures 126 can comprise said locked configuration 502*b* and said one or more cavities 506.

In one embodiment, said two or more spools 402 can comprise said one or more pin catches 500.

In one embodiment, said first spool 402*a* can comprise said first pin catch 500*a*.

In one embodiment, said second spool 402*b* can comprise said second pin catch 500*b*.

In one embodiment, said retraction assembly 124 can comprise said one or more pin catches 500 configured for catching a portion of said plurality of configurations 502, such as said pins 508.

With said one or more key locks 108 in said locked configuration 502*b*, said pins 508 can be rotated down to interfere with rotation of said two or more spools 402. With said one or more key locks 108 in said unlocked configuration 502*a*, said pins 508 can be rotated back to allow said two or more spools 402 to rotate freely. Said one or more key locks 108 can be selectively engaged between said plurality of configurations 502 by rotating said one or more key locks 108 with said keyhole 504, as is known in the art. In one embodiment, said activation system 210 can monitor a status of said one or more key locks 108 with respect to said plurality of configurations 502.

In one embodiment, one or more lock-pin enclosures 126 can protect said pins 508 with said one or more key locks 108 in said unlocked configuration 502*a*.

In one embodiment, said retraction assembly 124 can comprise locking mechanisms similar to that of seatbelts, center fugal locks, or similar.

In one embodiment, said one or more lock-pin enclosures 126 can be used to seal first cavity 300 from second cavity 302; wherein, moisture may be fed into first cavity 300 through said aperture divider 406.

In one embodiment, said retraction assembly 124 can comprise cylindrical spools configured to selectively rotate on an axis and resist rotation with a spring; wherein, said retraction assembly 124 are configured for storing, releasing and retracting said strap 1106 (illustrated below), as is known in the art. In one embodiment, said retraction assembly 124 can comprise said first spool 402*a* and said second spool 402*b*; however, said retraction assembly 124 can comprise separate enclosures for storing and dispensing said strap 1106.

Figure 6A:
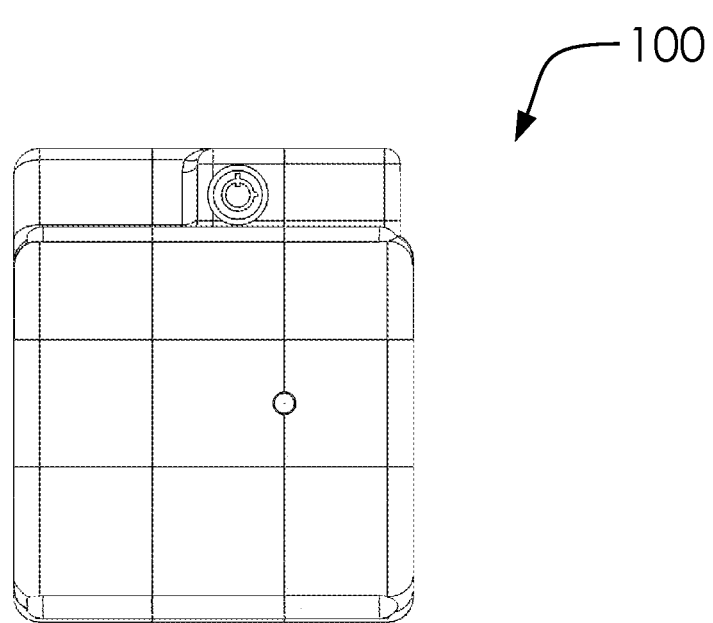
FIG. 6A illustrates elevated side view of base 100.
Figure 6B:
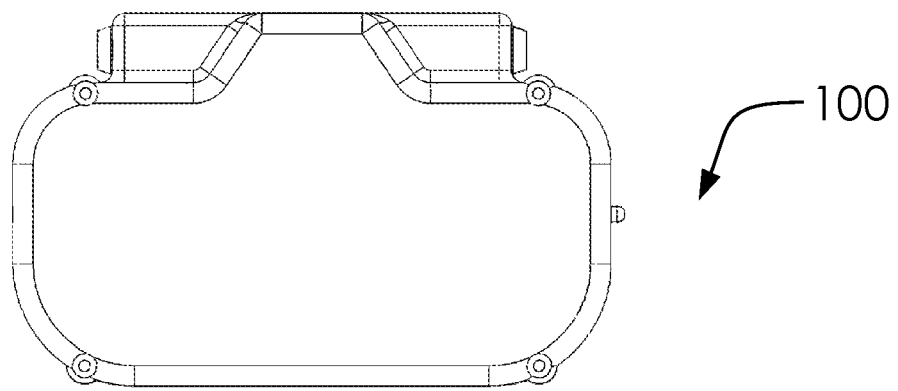
FIG. 6B illustrates elevated front view of base 100.
Figure 6C:
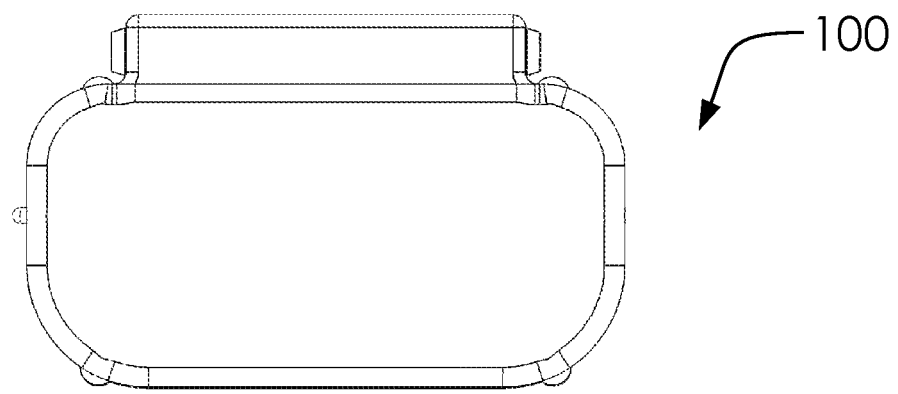
FIG. 6C illustrates elevated backside view of base 100.
Figure 7:
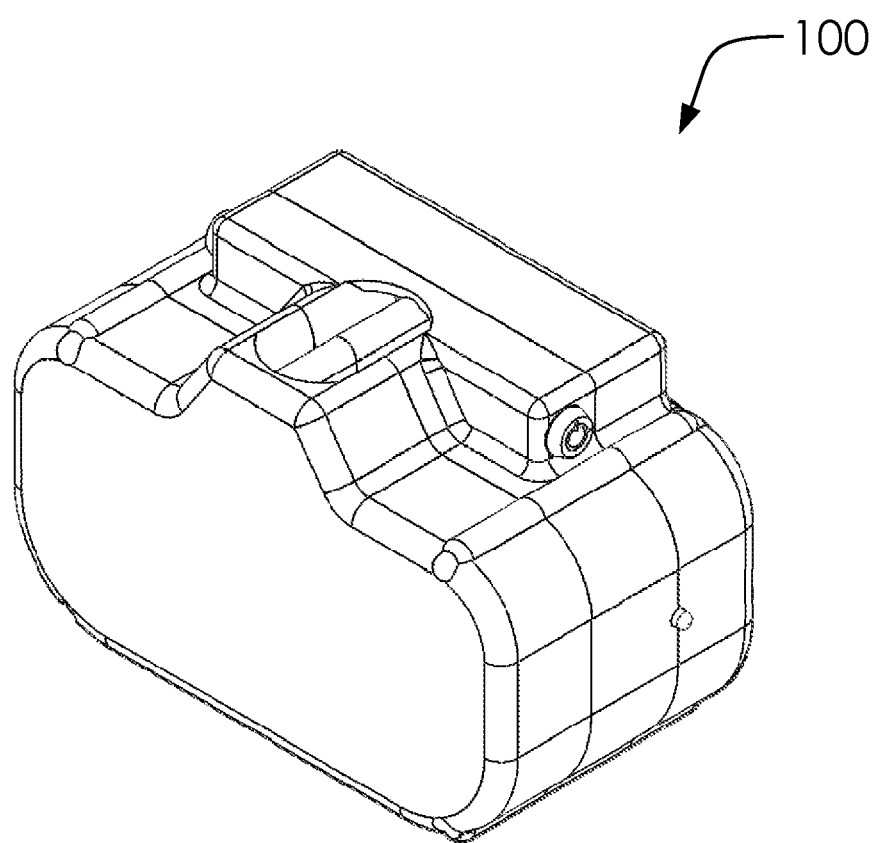
FIG. 7 illustrates perspective overview of base 100.

FIG. 6A illustrates elevated side view of base 100.
FIG. 6B illustrates elevated front view of base 100.
FIG. 6C illustrates elevated backside view of base 100.
FIG. 7 illustrates perspective overview of base 100.

Figure 8A:
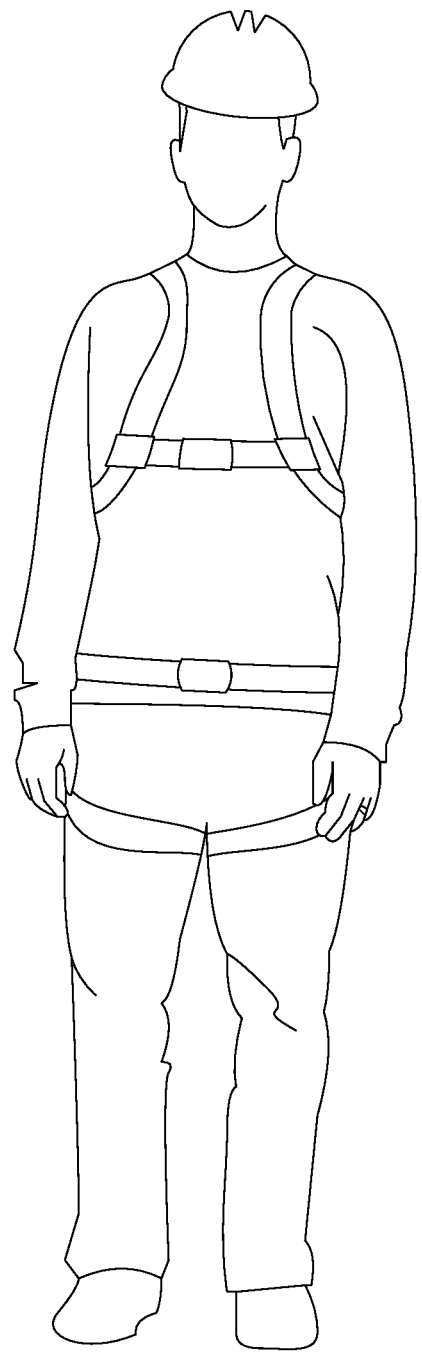
FIG. 8A illustrates perspective front view user 800.
Figure 8B:
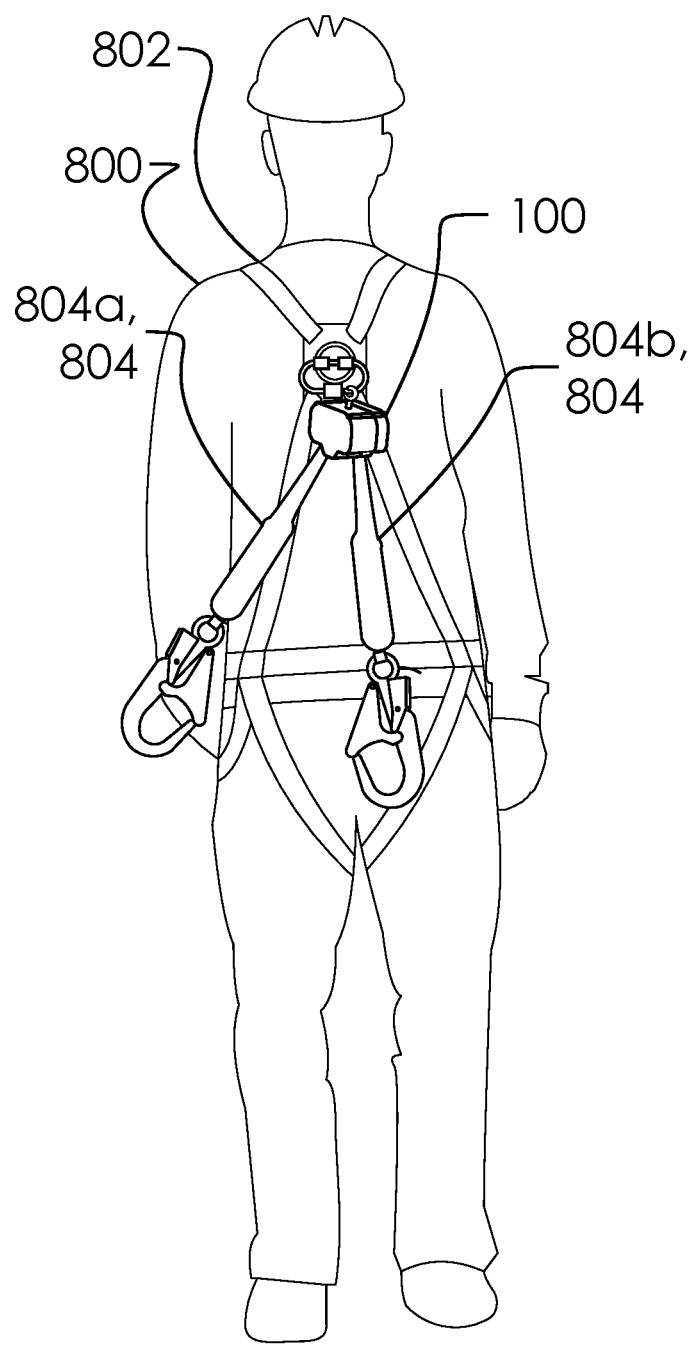
FIG. 8B illustrates perspective overview of user 800.

FIG. 8A illustrates perspective front view user 800.
FIG. 8B illustrates perspective overview of user 800.

In one embodiment, said one or more tether assemblies 804 can comprise said first tether assembly 804*a* and said second tether assembly 804*b*.

In one embodiment, said safety monitoring harness system 200 can comprise said one or more tether assemblies 804.

In one embodiment, said base 100 can be used in conjunction with said harness assembly 802 and said one or more tether assemblies 804, as illustrated. In one embodiment, said user 800 can secure said harness assembly 802 to his body, as is known in the art. In one embodiment, said base 100 can replace prior art yo-yo systems which simply extend and retract without monitoring and safety features described herein.

In one embodiment, said one or more tether assemblies 804 can be attached to said retraction assembly 124 on said two or more spools 402 and selectively in and out of said two or more strap apertures 400.

In one embodiment, said one or more tether assemblies 804 can comprise a one or more tether assemblies, or just said first tether assembly 804*a*. In such an embodiment, such as when a roofer might use said safety monitoring harness system 200, an alarm can signal when said first tether assembly 804*a* is retracted within said base 100.

Figure 9:
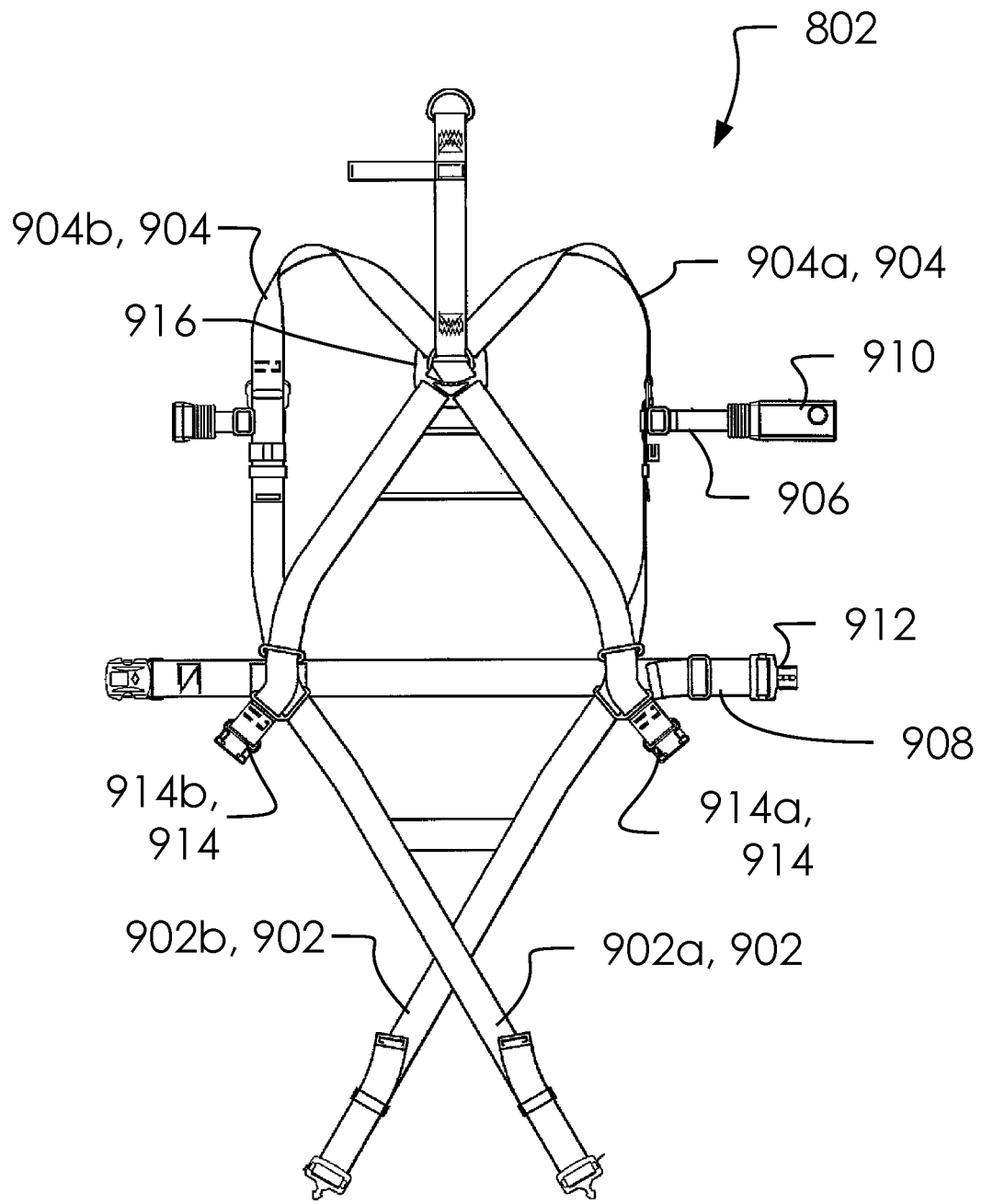
FIG. 9 illustrates elevated front view of said harness assembly 802.

FIG. 9 illustrates elevated front view of said harness assembly 802.

In one embodiment, said leg straps 902 can comprise said first leg strap 902*a* and said second leg strap 902*b*.

In one embodiment, said shoulder straps 904 can comprise said first shoulder strap 904*a* and said second shoulder strap 904*b*.

In one embodiment, said leg buckles 914 can comprise said first leg buckle 914*a* and said second leg buckle 914*b*.

In one embodiment, said harness assembly 802 can comprise said leg straps 902, said first leg strap 902*a*, said second leg strap 902*b*, said shoulder straps 904, said first shoulder strap 904*a*, said second shoulder strap 904*b*, said chest strap 906, said waist strap 908, said chest buckle 910, said waist buckle 912, said leg buckles 914, said first leg buckle 914*a*, said second leg buckle 914*b* and said back attaching buckle 916.

In one embodiment, said harness assembly 802 can comprise a prior art rendering of a harness system. Various embodiments of said harness assembly 802 are known in the art, and are incorporated by reference herein. This illustration is included from U.S. Pat. No. 8,482,401B2.

Figure 10:
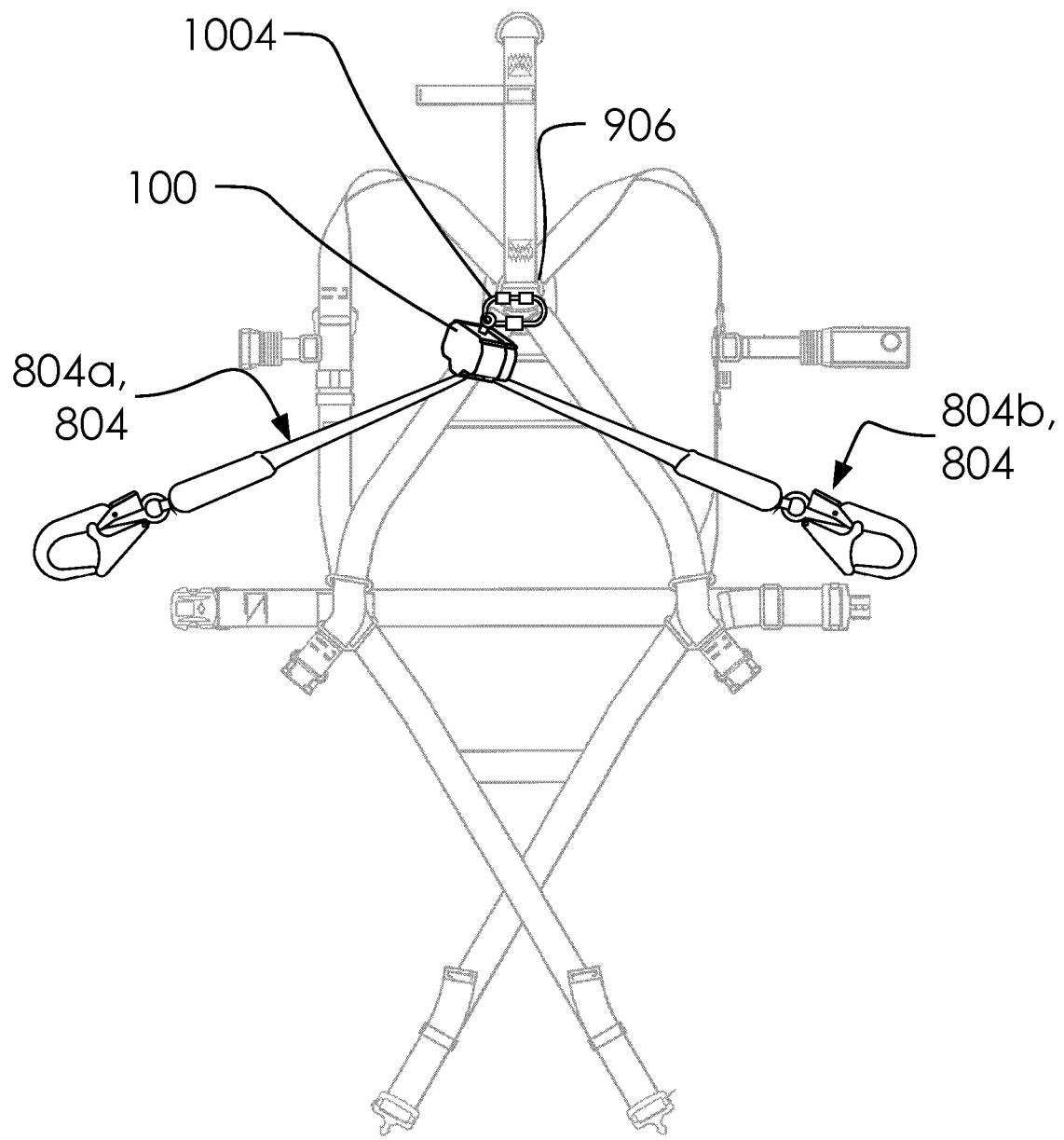
FIG. 10 illustrates elevated front view one or more tether assemblies 804.

FIG. 10 illustrates elevated front view one or more tether assemblies 804.

In one embodiment, said base 100 can attach to said harness assembly 802 with said carabiner 1004 attached to said back attaching buckle 916. In one embodiment, said base 100 with said one or more tether assemblies 804 be configured to keep said user 800 safe with the added smart-features as well as the physical configuration of said base 100.

Figure 11:
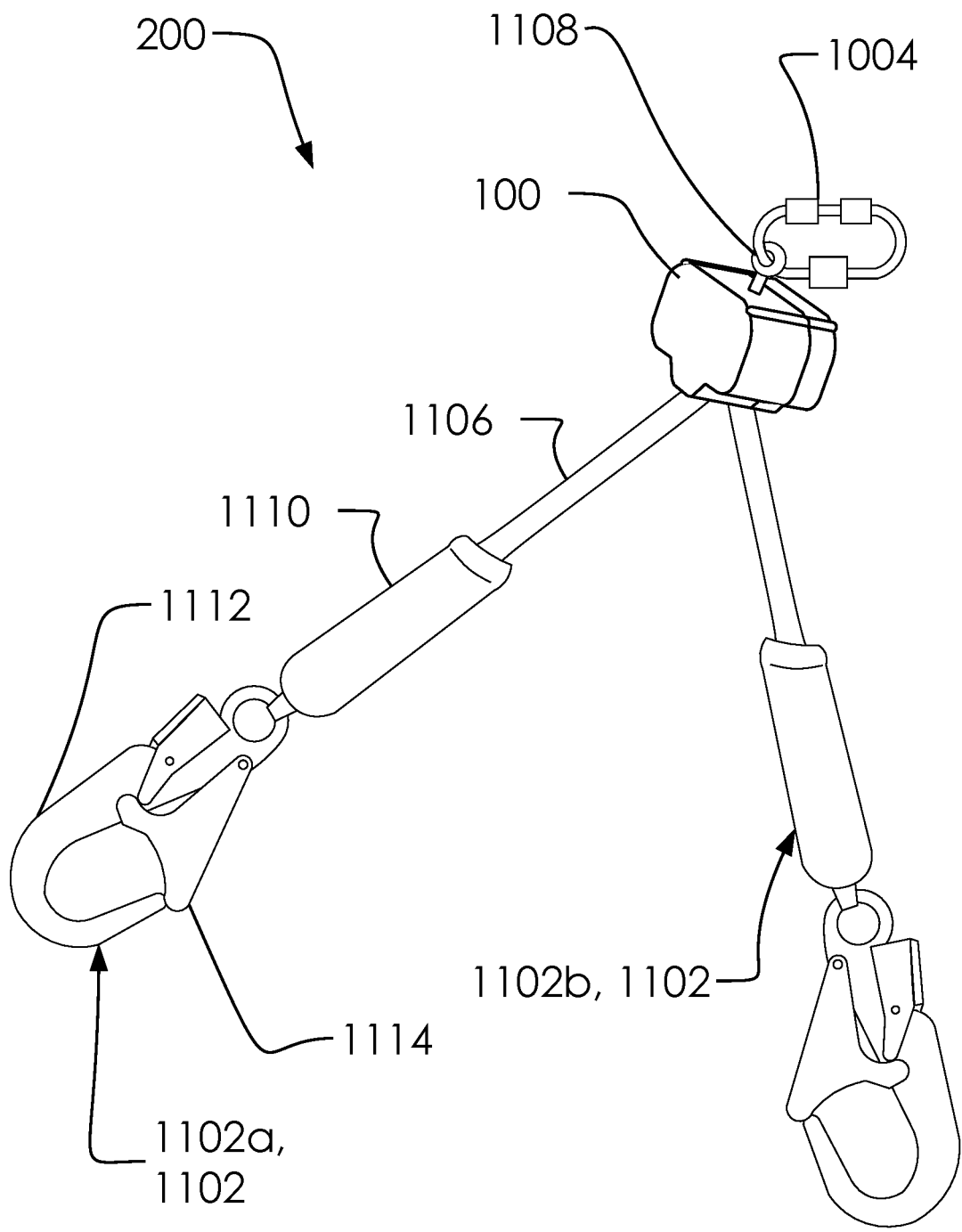
FIG. 11 illustrates perspective overview safety monitoring harness system 200 with base 100 and one or more tether assemblies 804.

FIG. 11 illustrates perspective overview safety monitoring harness system 200 with base 100 and one or more tether assemblies 804.

In one embodiment, said anchoring hook 1102 can comprise said first hook 1102*a* and said second hook 1102*b*.

In one embodiment, said eye 1108 attaches to said carabiner 1004 and secures said base 100 to said carabiner 1004. Said base 100 can selectively dispense and retract said strap 1106. In one embodiment, said strap 1106 can attach to said base 100 at one end and to said deceleration portion 1110 at another end. In one embodiment, said strap 1106 can comprise a durable material suitable for supporting and saving the life of said user 800 in the case of a fall, as is known in the art.

In one embodiment, said deceleration portion 1110 can selectively release a tightly packed strap similar to said strap 1106, but intended to slow the acceleration of a falling person, such as said climber 1622.

In one embodiment, said anchoring hook 1102 comprise a device configured to secure said user 800 to anchoring points, as discussed below and as is known in the art.

As compared to the prior art, said one or more tether assemblies 804 in said safety monitoring harness system 200 can comprise instrumentation and feedback mechanisms as associated with the interplay between said base 100 and said strap 1106.

In one embodiment, said base 100 can comprise a single unit configured to accommodate two among one or more tether assemblies 804.

Figure 12A:
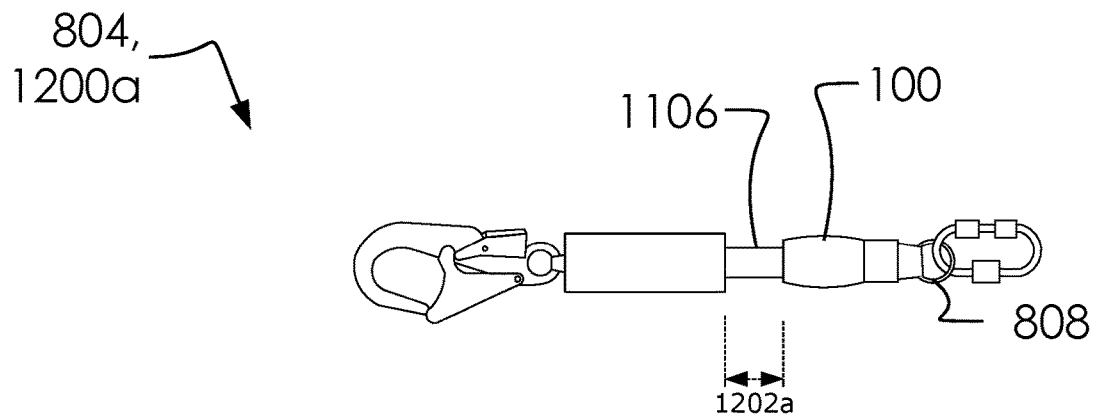

FIG. 12A illustrates elevated overview of retracted configuration 1200a.

Figure 12B:
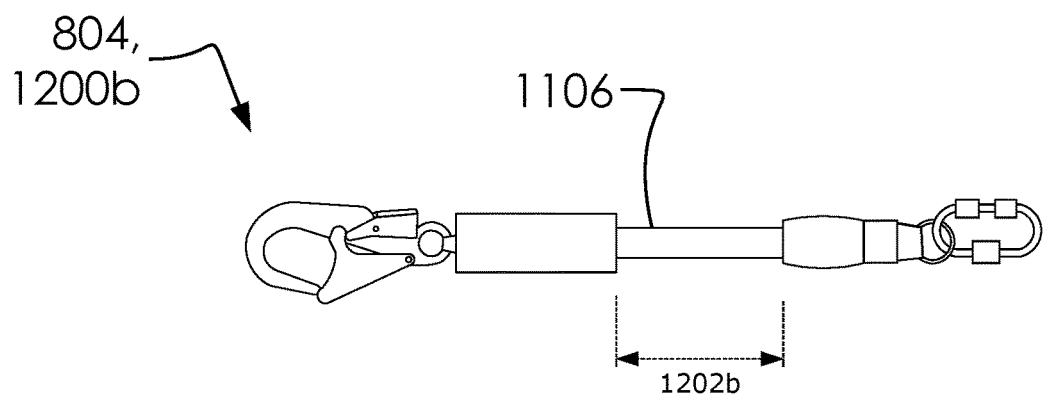
FIG. 12B illustrates elevated overview of second configuration 1200b.

FIG. 12B illustrates elevated overview of second configuration 1200b.

Figure 12C:
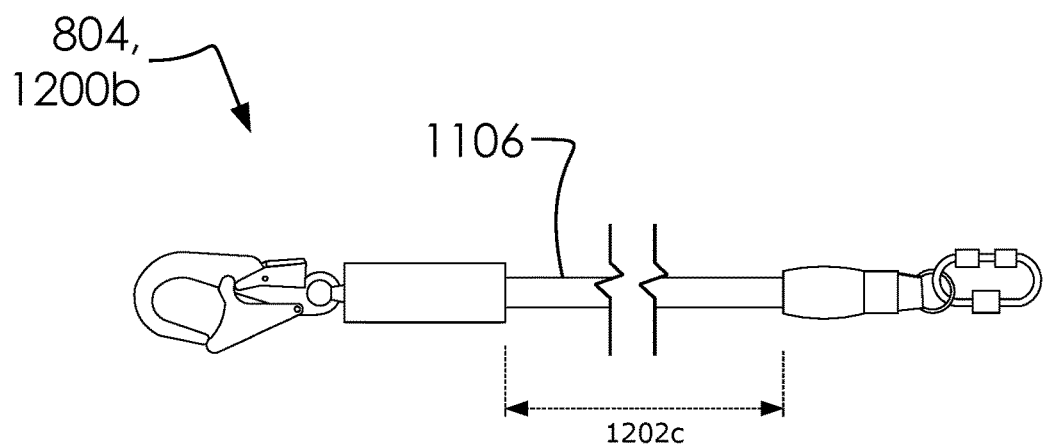
FIG. 12C illustrates elevated overview of fully extended configuration 1200c.

FIG. 12C illustrates elevated overview of fully extended configuration 1200c.

In one embodiment, said extension configurations 1200 can comprise said retracted configuration 1200a, said second configuration 1200b and said fully extended configuration 1200c.

In one embodiment, said plurality of lengths 1202 can comprise said retracted length 1202a, said second length 1202b and said fully extended length 1202c.

As is known in the art, said one or more tether assemblies 804 can retract and dispense portions of said strap 1106. Illustrated herein, are various lengths of said strap 1106, labeled as said plurality of lengths 1202.

In one embodiment, said base 100 can monitor, process and record the state of said strap 1106 between said retracted configuration 1200a and said fully extended configuration 1200c.

Figure 13:
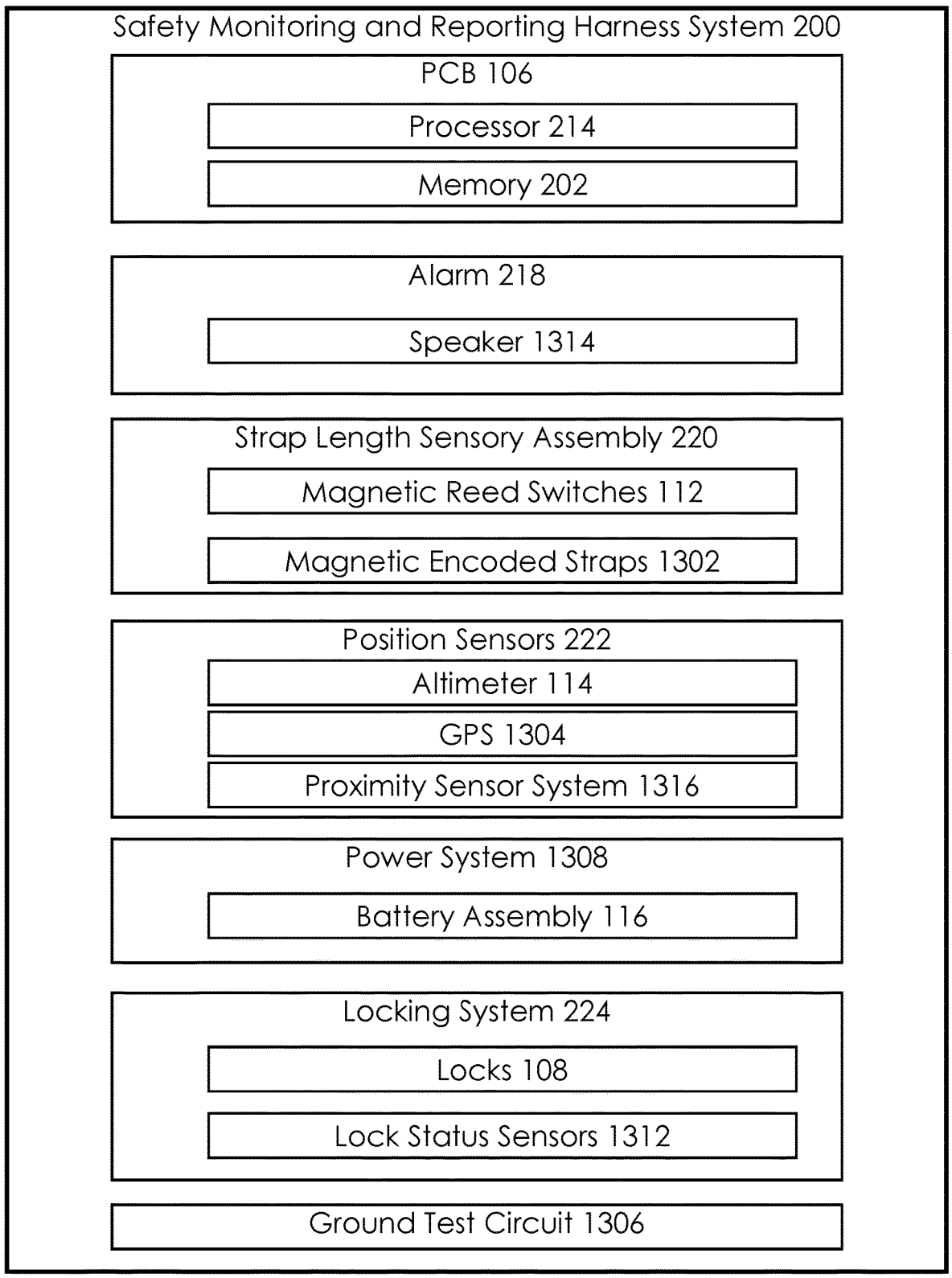
FIG. 13 illustrates detailed block diagram of safety monitoring harness system 200.

FIG. 13 illustrates detailed block diagram of safety monitoring harness system 200.

In one embodiment, said strap length sensor assembly 220 can comprise said magnetic encoded straps 1302.

In one embodiment, said position sensors 222 can comprise said GPS 1304 and said proximity sensor system 1316.

In one embodiment, said locking system 224 can comprise said lock status sensors 1312.

In one embodiment, said 1 data storage 1910 can comprise the ability to calculate one or more conditions based on the inputs discussed above. In one embodiment, said x1100x/can comprise said x1804x/for processing, said x11004x/and said altimeter 1310 for calculating location and altitude, said ground test circuit 1306 for storing programs and logs, said power system 1308 for powering said x1802x/, said lock status sensors 1312 for communicating with said one or more computers 1906 and said network 1912, and said speaker 1314 for communicating alerts to said climber 1622.

Figure 14A:
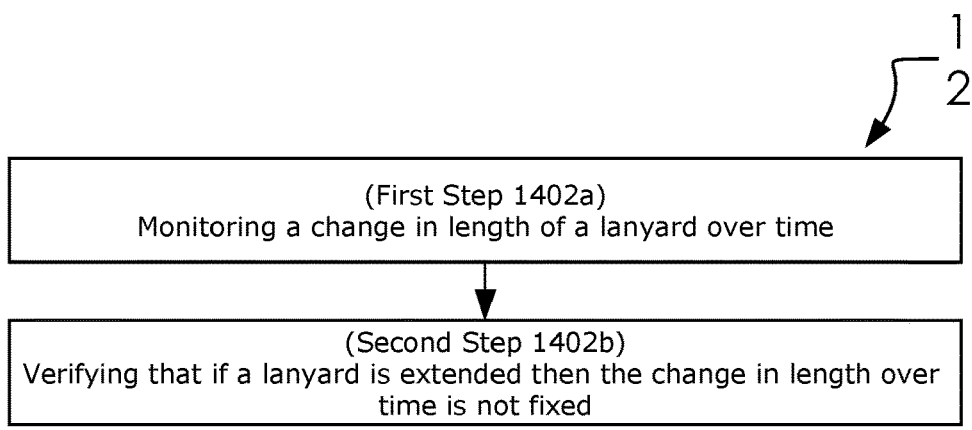
FIG. 14A illustrates said safety monitoring method 1400.

FIG. 14A illustrates said safety monitoring method 1400.

Figure 14B:
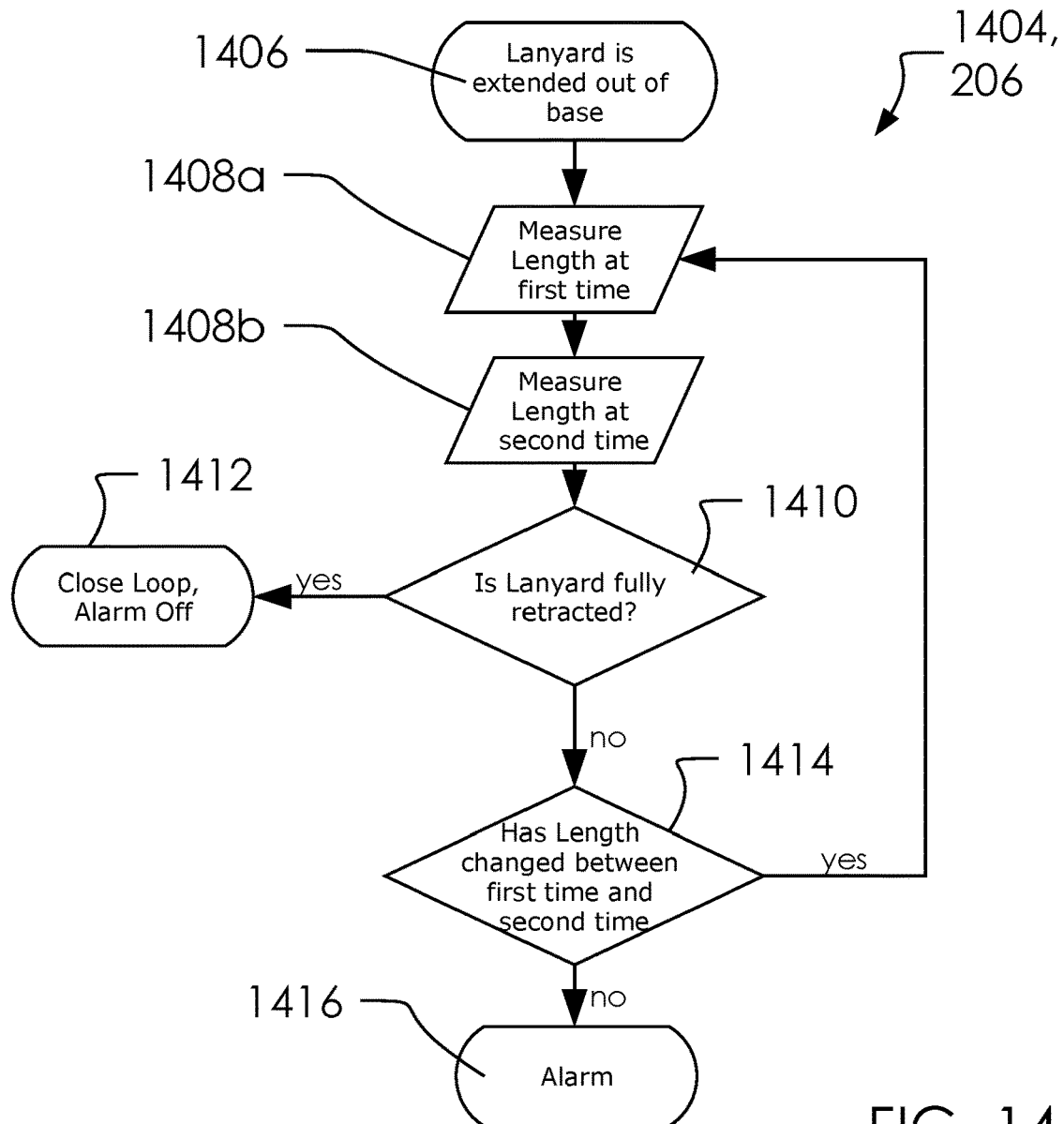
FIG. 14B illustrates said length monitoring method flow chart 1404.

FIG. 14B illustrates said length monitoring method flow chart 1404.

In one embodiment, said safety monitoring method 1400 can comprise said safety monitoring method 1400, said one or more steps 1402 and said length monitoring method flow chart 1404.

In one embodiment, said one or more steps 1402 can comprise said first step 1402a and said second step 1402b.

In one embodiment, said length monitoring method flow chart 1404 can comprise said initial step 1406, said initial step 1406, said one or more measure length over time steps 1408, said verify change in length over time step 1410, said close loop step 1412, said verify length change over time step 1414 and said alarm step 1416.

In one embodiment, said one or more measure length over time steps 1408 can comprise said measure length at first time step 1408a and said measure length at second time step 1408b.

In one embodiment, safety monitoring method 1400 can comprise a method of preventing said user 800 from tricking said safety monitoring harness system 200 into giving a safe signal when said user 800 is not properly tied off.

In one embodiment, first step 1402a can comprise monitoring a status of said plurality of lengths 1202 (such as retracted length 1202a and fully extended length 1202c) and recording said plurality of lengths 1202 over a time period. In one embodiment, a change of length over a change of time (delta distance over delta time) can indicate whether said one or more tether assemblies 804 are actively moving or otherwise in a static length. In one embodiment, where said strap 1106 is not in a completely retracted position, then said plurality of lengths 1202 should be changing over time, even when that change is small and alternates from extending and contracting.

In one embodiment, said safety monitoring method 1400 can be expressed more precisely in said length monitoring method flow chart 1404.

In one embodiment, said safety monitoring harness system 200 can begin said length monitoring method flow chart 1404 when said one or more tether assemblies 804 are extended from said base 100 (said initial step 1406). Said one or more measure length over time steps 1408 can comprise said measure length at first time step 1408a and said measure length at second time step 1408b. Said safety monitoring harness system 200 can be configured to measure at meaningful time frequencies to ensure movement can be made by the user between measurements. One such time frequency between the first reading and the second reading might be one second, for example.

Said verify change in length over time step 1410 can verify that said one or more tether assemblies 804 isn't fully retracted, if it is, said length monitoring method flow chart 1404 stops without alarm. In one embodiment, said one or more tether assemblies 804 is extended and said verify length change over time step 1414 can determine if said one or more tether assemblies 804 is moving or not. If said one or more tether assemblies 804 is extended but not moving, an alarm can sound (said alarm step 1416), otherwise, said length monitoring method flow chart 1404 can return to said one or more measure length over time steps 1408 and repeat said length monitoring method flow chart 1404.

Figure 15:
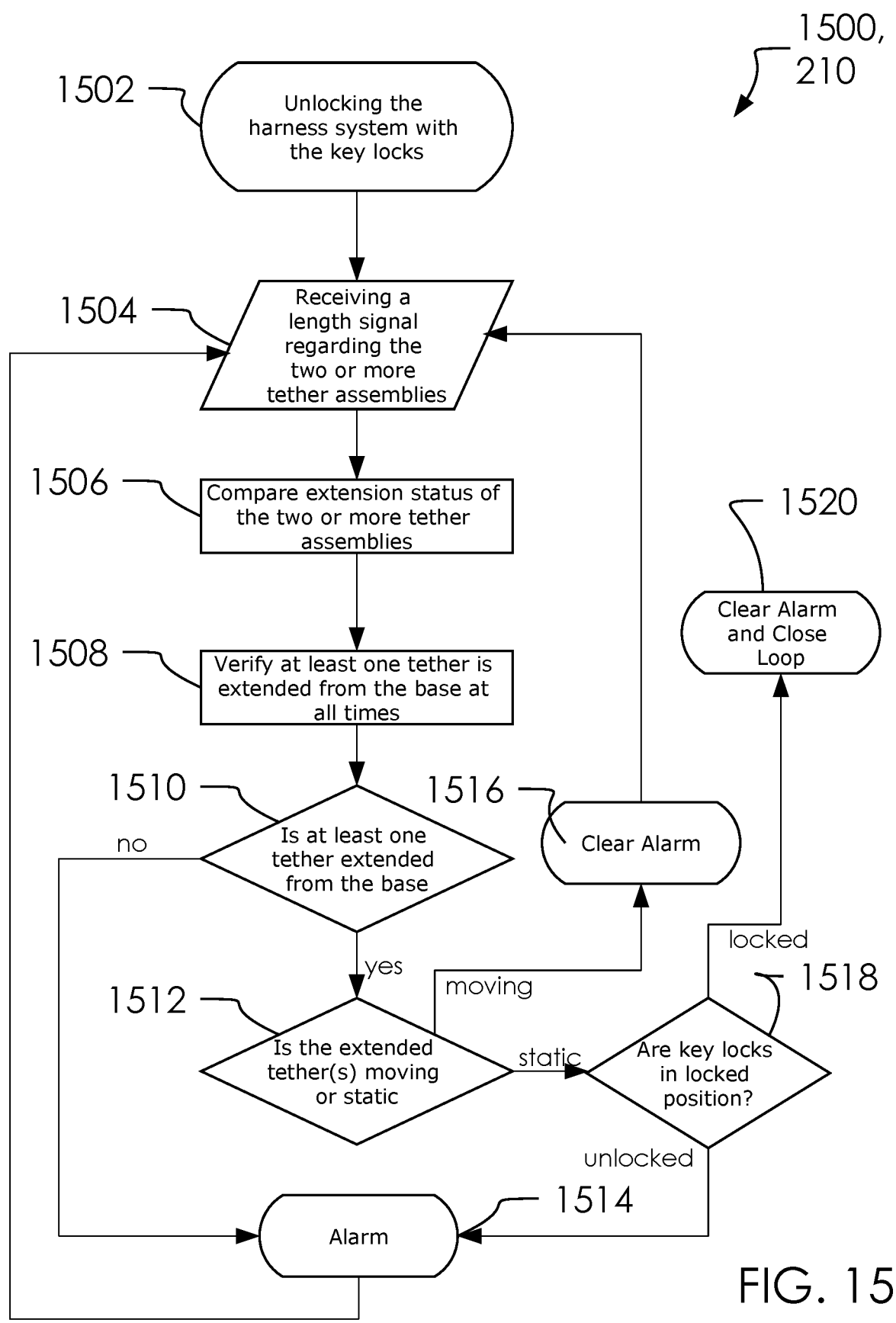
FIG. 15 illustrates said safety arming and monitoring method 1500.

FIG. 15 illustrates said safety arming and monitoring method 1500.

In one embodiment, said safety arming and monitoring method 1500 can comprise said receiving tether status signal step 1504, said comparing tether statuses step 1506, said verifying safe extension status step 1508, said verify one tether is extended step 1510, said verifying not static step 1512, said verify alarm step 1514, said clear alarm step 1516, said verify lock status step 1518 and said clear alarm and close loop step 1520.

In one embodiment, said safety arming and monitoring method 1500 can comprise a portion of said activation system 210.

In one embodiment, said unlocking step 1502 can comprise unlocking said one or more key locks 108 into said unlocked configuration 502*a*; said receiving tether status signal step 1504 can comprise measuring a length of said one or more tether assemblies 804 using said strap length sensor assembly 220 or by measuring a rotary status of said two or more spools 402; and said verifying not static step 1512 can comprise said safety monitoring method 1400 (described above). Said safety arming and monitoring method 1500 can be configured to alarm (said alarm step 1514) until the system is either locked or at least one tether is moving once again. In one embodiment, said safety arming and monitoring method 1500 can terminate when the locks are back into said locked configuration 502*b*.

Figure 16:
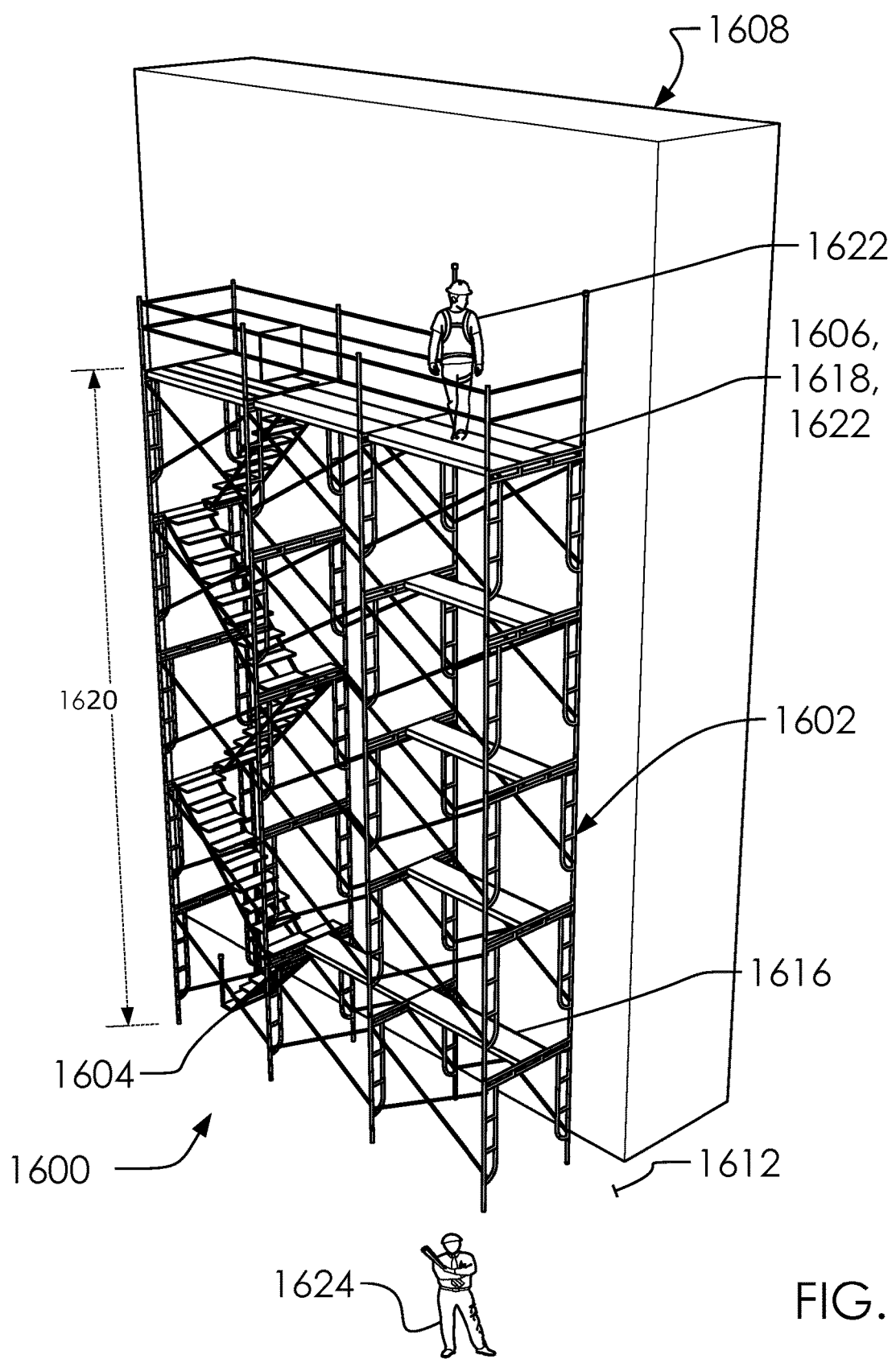
FIG. 16 illustrates a perspective overview view of worksite 1600.

FIG. 16 illustrates a perspective overview view of worksite 1600.

In one embodiment, said worksite 1600 can comprise said scaffolding 1602, said stairs 1604, said elevated platform 1606, said construction project 1608, said ground 1612, said unsafe zone 1614, said starting point 1616, said height 1618 and said safe zone 1620.

In one embodiment, said strap 1106 can comprise said supervisor 1624.

In one embodiment, said user 800 can comprise said climber 1622 and said supervisor 1624.

In one embodiment, said safety monitoring harness system 200 can be used on said worksite 1600. Said worksite 1600 can comprise scaffolding 1602, and construction project 1608. Although said safety arming and monitoring method 1500 would cause said safety monitoring harness system 200 to begin looking for use of said one or more tether assemblies 804 immediately after unlocking said one or more key locks 108, it may be desirable to prevent an alarm condition until said user 800 (such as climber 1622) has arrived at the end of said safe zone 1620 and ready to climb out into said unsafe zone 1614. For example, in one embodiment, said stairs 1604 and said elevated platform 1606 can be classified as said safe zone 1620, even through said elevated platform 1606 is at said safe zone 1620; where said supervisor 1624 unlocks said one or more key locks 108 at said ground 1612 said safety monitoring harness system 200 would alarm until said one or more tether assemblies 804 are extended and moving.

Figure 17A:
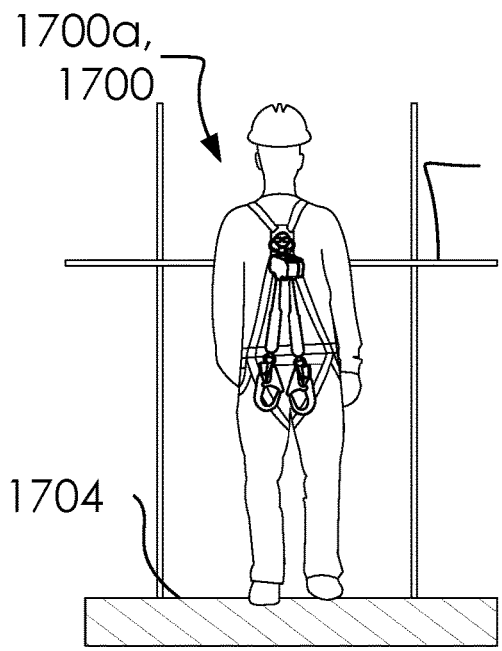
FIG. 17A illustrates an elevated back side view of unattached configuration 1700*a*.

FIG. 17A illustrates an elevated back side view of unattached configuration 1700*a*.

Figure 17B:
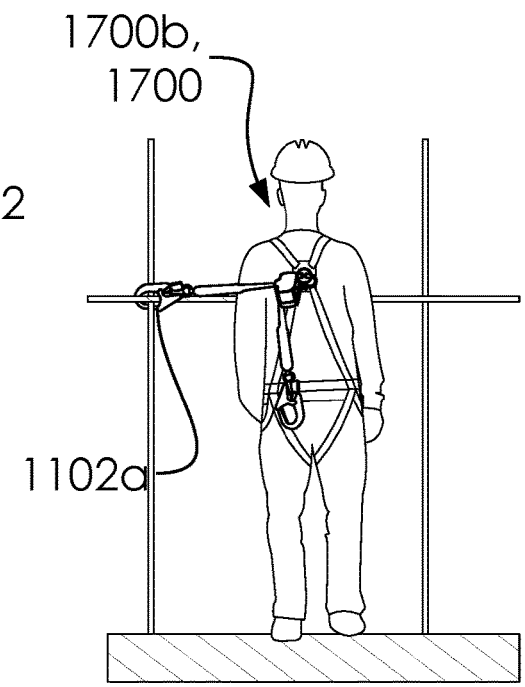
FIG. 17B illustrates an elevated back side view of first partially attached configuration 1700*b*.

FIG. 17B illustrates an elevated back side view of first partially attached configuration 1700*b*.

Figure 17C:
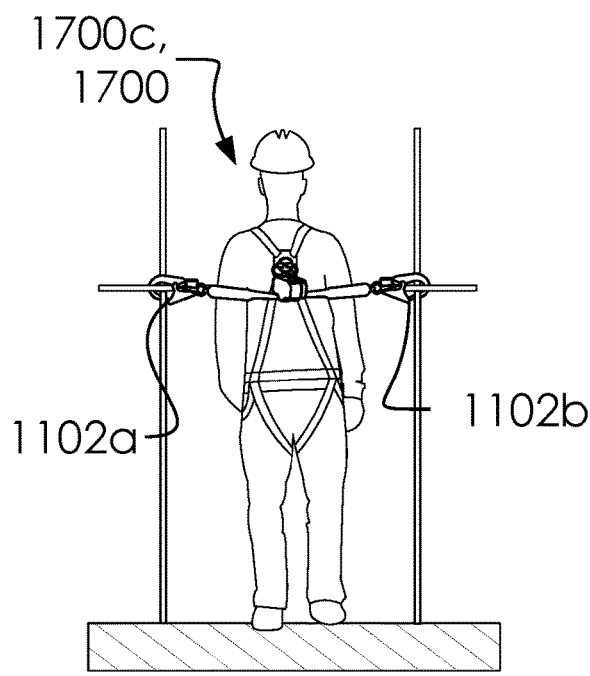
FIG. 17C illustrates an elevated back side view of fully attached configuration 1700*c*.

FIG. 17C illustrates an elevated back side view of fully attached configuration 1700*c*.

Figure 17D:
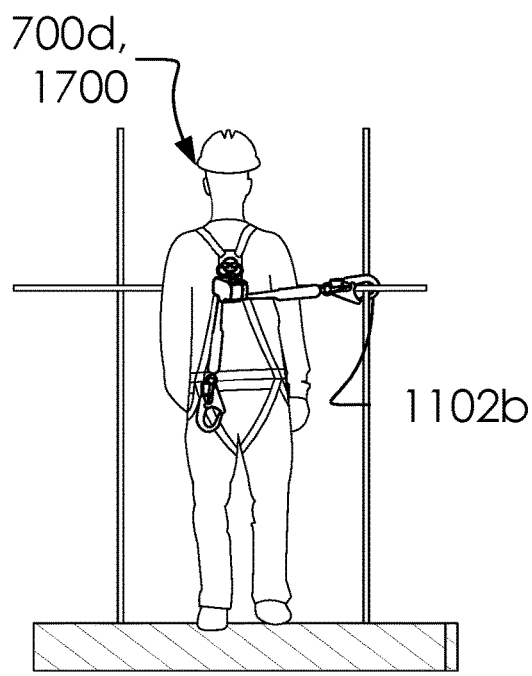
FIG. 17D illustrates an elevated back side view of second partially attached configuration 1700*d*.

FIG. 17D illustrates an elevated back side view of second partially attached configuration 1700*d*.

In one embodiment, said tether configurations 1700 can comprise said unattached configuration 1700*a*, said first partially attached configuration 1700*b*, said fully attached configuration 1700*c* and said second partially attached configuration 1700*d*.

In one embodiment, said safety monitoring harness system 200 can comprise a means of securing and monitoring a state of said one or more tether assemblies 804 when said climber 1622 is in peril while working at unsafe heights.

In one embodiment, said unattached configuration 1700*a* can comprise said climber 1622 completely detached from said anchor point 1702. Said first partially attached configuration 1700*b* can comprise said first tether assembly 804*a* attached to said anchor point 1702 and said second tether assembly 804*b* detached. Said fully attached configuration 1700*c* can comprise both of said one or more tether assemblies 804 attached to said anchor point 1702. Said second partially attached configuration 1700*d* can comprise said first tether assembly 804*a* detached and said second tether assembly 804*b* attached to said anchor point 1702.

In one embodiment, said platform 1704 can comprise any place said climber 1622 might work or otherwise need to be secured. In one embodiment, a safety protocol might require said climber 1622 to be at least partially secured at all times, even while ascending a structure; thus, said climber 1622 would be responsible to alternate between said first partially attached configuration 1700*b*, said fully attached configuration 1700*c*, and said second partially attached configuration 1700*d*, and back again.

Figure 18A:
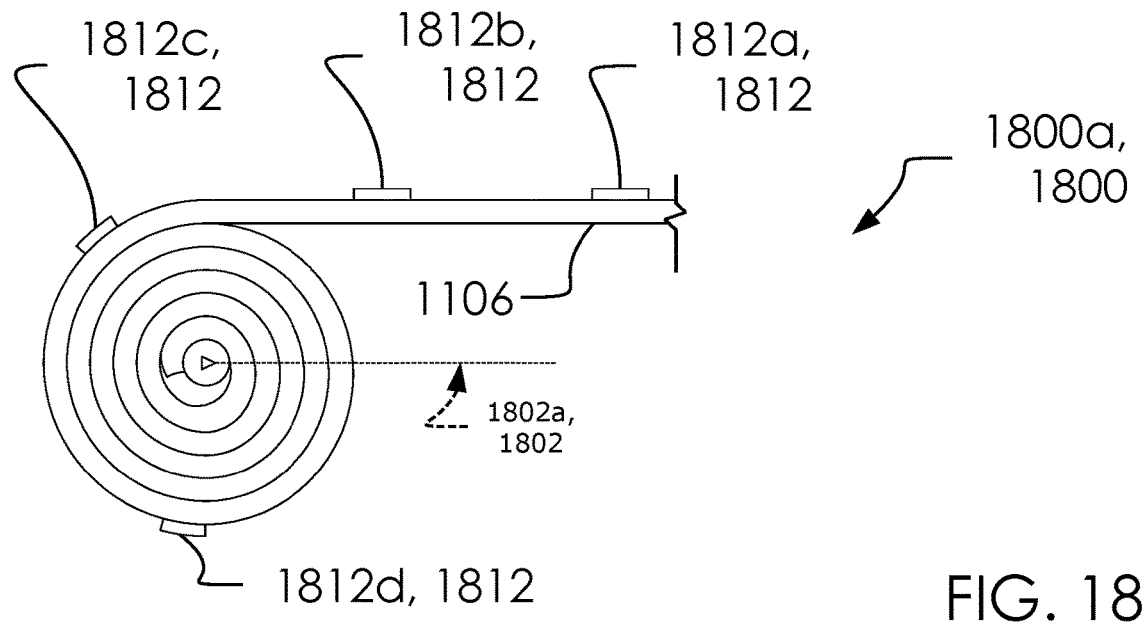
FIG. 18A illustrates an elevated front side view of first retraction stage 1800*a*.

FIG. 18A illustrates an elevated front side view of first retraction stage 1800*a*.

Figure 18B:
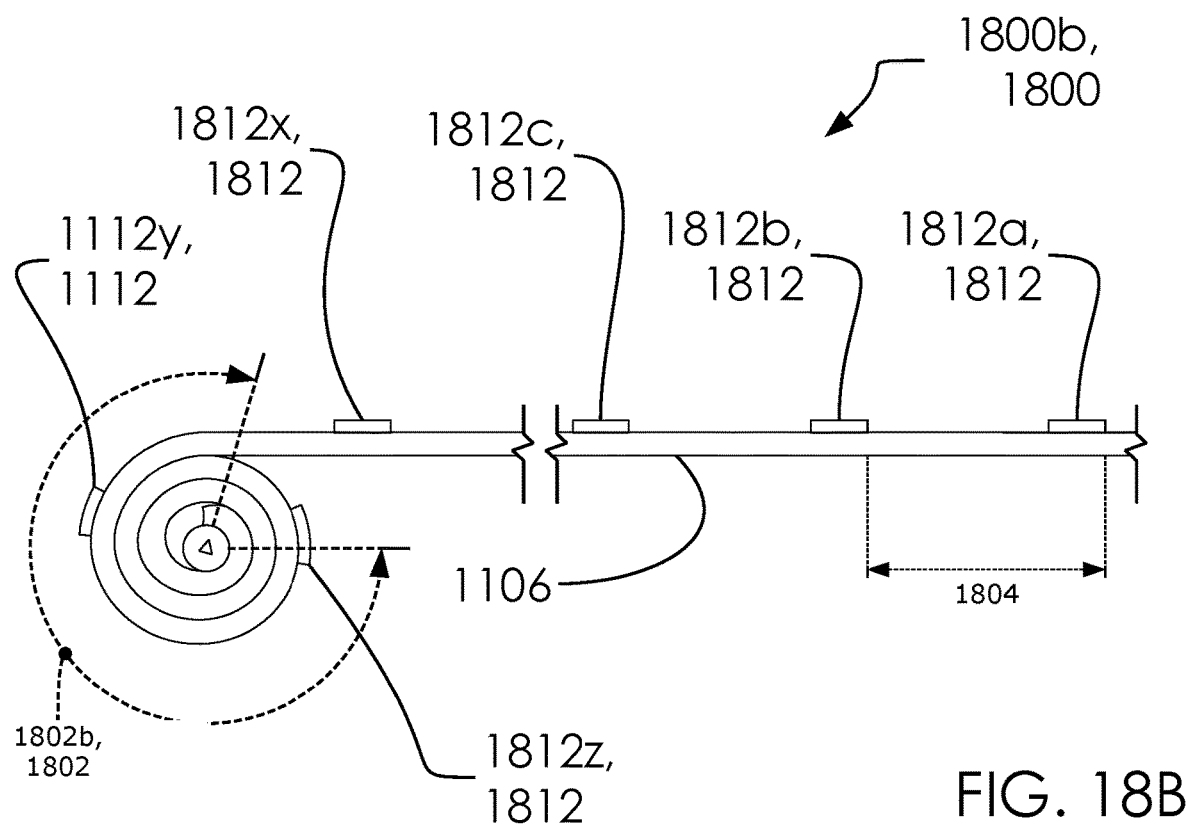
FIG. 18B illustrates an elevated front side view of second retraction stage 1800*b*.

FIG. 18B illustrates an elevated front side view of second retraction stage 1800*b*.

In one embodiment, said plurality of retraction stages 1800 can comprise said first retraction stage 1800*a* and said second retraction stage 1800*b*.

In one embodiment, said plurality of radial stages 1802 can comprise said first radial stage 1802*a* and said second radial stage 1802*b*.

In one embodiment, said plurality of strap markers 1812 can comprise said fourth strap marker 18122, said first strap marker 1812*a*, said second strap marker 1812*b*, said third strap marker 1812*c*, said fifth strap marker 1812*y* and said sixth strap marker 1812*z*.

In one embodiment, said strap 1106 can comprise said plurality of retraction stages 1800, said plurality of radial stages 1802, said second radial stage 1802*b* and said plurality of strap markers 1812.

For illustrative purposes, said strap 1106 and said plurality of strap markers 1812 are illustrated as thicker than they could be constructed in a preferred version of said strap 1106. Accordingly, said plurality of strap markers 1812 and said strap 1106 can comprise a thickness smaller than said two or more strap apertures 400, and able to freely move into and out of said base 100.

In one embodiment, said strap 1106 can unwind through said two or more strap apertures 400, as between said retracted configuration 1200*a* and said fully extended configuration 1200*c*.

In one embodiment, said marker interval 1804 can be aligned with said strap 1106 at known intervals which can be substantially equal to one another.

In one embodiment, said one or more mag reed switches 112 can sense movement of said strap 1106 by measuring interactions between said plurality of strap markers 1812 and said one or more mag reed switches 112; in turn, said strap length sensor assembly 220 can calculate a position and movement of said strap 1106. As identified in FIG. 13, said strap 1106 with said plurality of radial stages 1802 can comprise said magnetic encoded straps 1302.

In one embodiment, said strap 1106 can be measured using rotary encoders.

Figure 19:
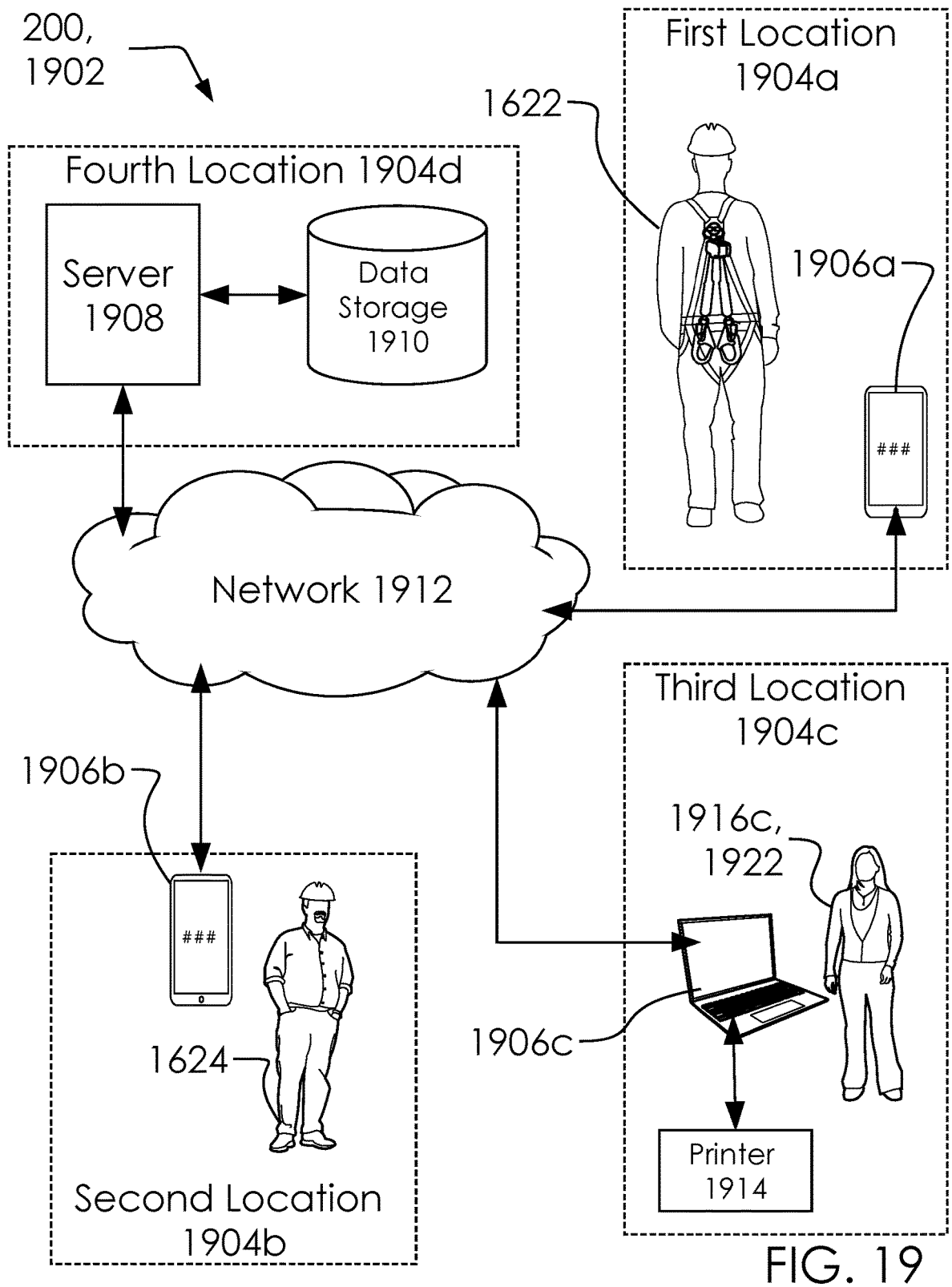
FIG. 19 illustrates a flow chart view of network diagram 1902.

FIG. 19 illustrates a flow chart view of network diagram 1902.

In one embodiment, said network diagram 1902 can comprise said one or more locations 1904, said one or more computers 1906, said server 1908, said data storage 1910, said network 1912 and said printer 1914.

In one embodiment, said one or more computers 1906 can comprise said first computer 1906a, said second computer 1906b and said third computer 1906c.

In one embodiment, said one or more locations 1904 can comprise said first location 1904a, said second location 1904b, said third location 1904c and said fourth location 1904d.

In one embodiment, said data storage 1910 can comprise said data storage 1910a.

In one embodiment, said safety monitoring system 1900 can comprise said one or more computers 1906, said server 1908, said data storage 1910, said network 1912 and said printer 1914.

In one embodiment, said one or more users 1916 can comprise said first user 1916a, said second user 1916b and said third user 1916c.

In one embodiment, said first user 1916a can comprise said climber 1918 and said administrator 1922.

In one embodiment, a printer 1914 can be hardwired to said network 1912 (not illustrated here), or said printer 1914 can connect to one of said one or more computers 1906 (such as said third computer 1906c, illustrated) via network 1912.

Said network 1912 can be a local area network (LAN), a wide area network (WAN), a piconet, or a combination of LANs, WANs, or piconets. One illustrative LAN is a network within a single business. One illustrative WAN is the Internet.

In one embodiment, said server 1908 represents at least one, but can be many servers, each connected to said network 1912. Said server 1908 can connect to a data storage 1910. Said data storage 1910 can connect directly to said server 1908, as shown in FIG. 19, or may exist remotely on said network 1912. In one embodiment, said data storage 1910 can comprise any suitable long-term or persistent storage device and, further, may be separate devices or the same device and may be collocated or distributed (interconnected via any suitable communications network).

In one embodiment, said one or more users 1916 can operate in different roles in relation to said safety monitoring harness system 200. For example, in one embodiment, a first user can comprise said climber 1622, a second user can comprise said supervisor 1624, and a third user can comprise can comprise said administrator 1922.

In one embodiment, said climber 1622 can comprise a worker with said base 100 connected directly to him.

In one embodiment, said supervisor 1624 can comprise a foreman or safety manager charged with the administration of workers such as said climber 1622. Said administrator 1922 can comprise a person with access to data concerning said climber 1622 and said supervisor 1624. In one embodiment, said administrator 1922 can comprise an upper manager at a remove site with a data summary of the status of said climber 1622 and others like him.

In one embodiment, said one or more locations 1904 can comprise various locations related to said safety monitoring harness system 200. In one embodiment, said first location 1904a can comprise a construction site, and in particular, can comprise a construction location at an altitude above the ground where said climber 1622 comprises a workman. Said second location 1904b can comprise a location at a construction site where said supervisor 1624 monitors one or more of said climber 1622. Said third location 1904c can comprise an office site used for administrative purposes. Finally, said fourth location 1904d can comprise a data center or server room, as is known in the art.

In one embodiment, network diagram 1902 can comprise a part of safety monitoring harness system 200. Said one or more locations 1904 is another part.

Figure 20:
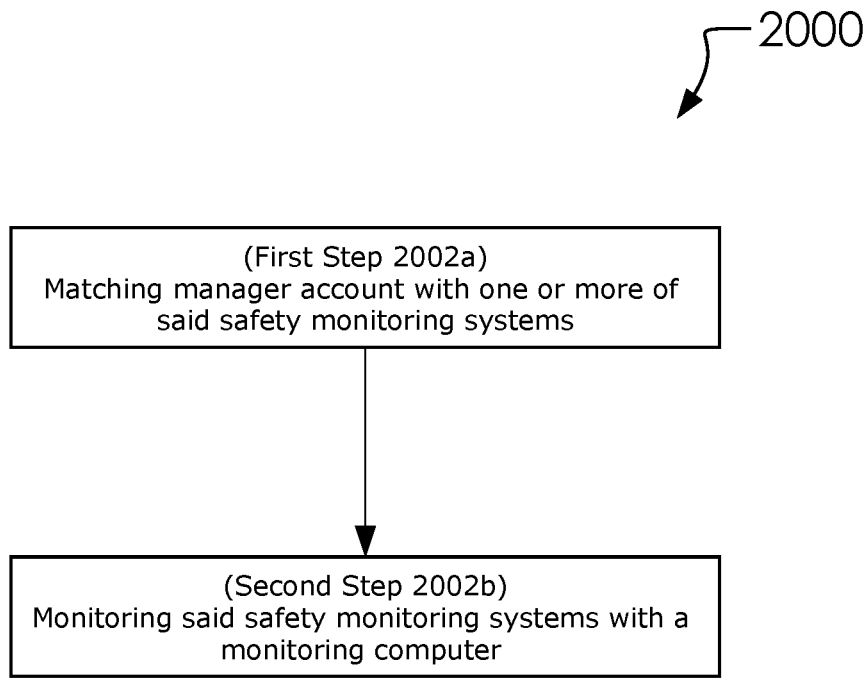
FIG. 20 illustrates a flow chart view of method of use 2000.

FIG. 20 illustrates a flow chart view of method of use 2000.

In one embodiment, said method of use 2000 can comprise said method of use 2000 and said one or more steps 2002.

In one embodiment, said one or more steps 2002 can comprise said first step 2002a and said second step 2002b.

In one embodiment, said safety monitoring system 1900 can comprise said method of use 2000.

In one embodiment, first step 2002a can comprise pairing said second computer 1906b of said supervisor 1624 with one or more among said first computer 1906a of said climber 1622.

In one embodiment, second step 2002b can comprise reporting a one or more signals from said safety monitoring harness system 200 to said second computer 1906b and/or said first computer 1906a.

Figure 21A:
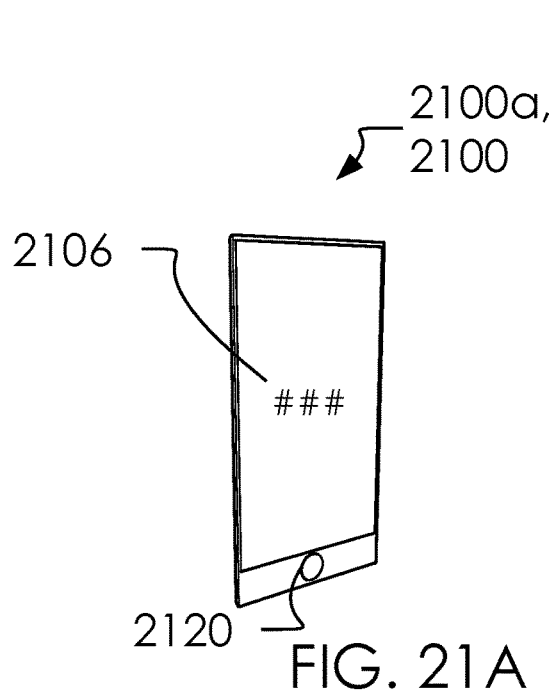
FIG. 21A illustrates a perspective overview view of mobile phone 2100*a*.

FIG. 21A illustrates a perspective overview view of mobile phone 2100a.

Figure 21B:
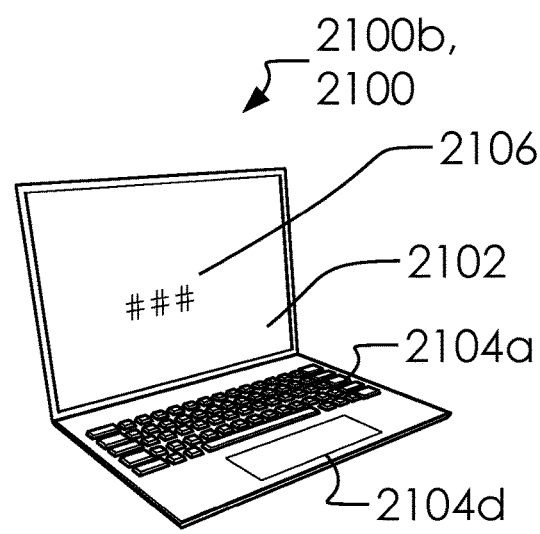
FIG. 21B illustrates a perspective overview view of personal computer 2100*b*.

FIG. 21B illustrates a perspective overview view of personal computer 2100b.

Figure 21C:
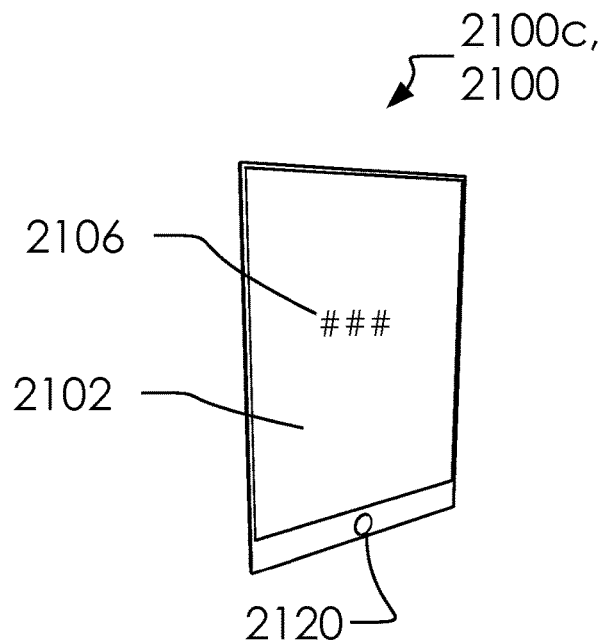
FIG. 21C illustrates a perspective overview view of tablet computer 2100*c*.

FIG. 21C illustrates a perspective overview view of tablet computer 2100c.

Figure 21D:
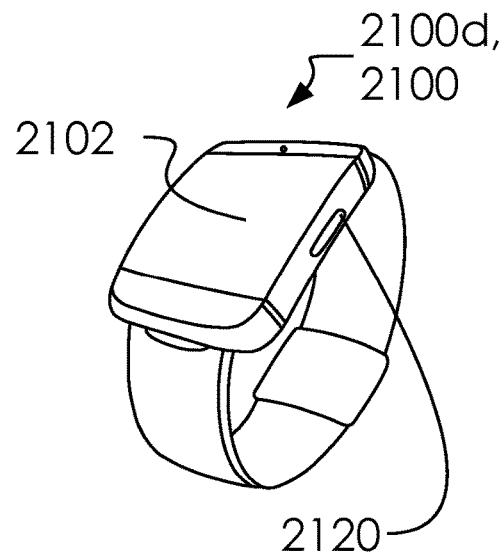
FIG. 21D illustrates a perspective overview view of wearable computer 2100*d*.

FIG. 21D illustrates a perspective overview view of wearable computer 2100d.

In one embodiment, said one or more input devices 2104 can comprise said keyboard 2104a, said trackball 2104b, said one or more cameras 2104c and said track pad 2104d.

In one embodiment, said computers types 2100 can comprise said mobile phone 2100a, said personal computer 2100b, said tablet computer 2100c and said wearable computer 2100d.

In one embodiment, said one or more computers 1906 can comprise said computers types 2100.

In one embodiment, said strap 1106 can comprise said wearable computer 2100d.

In the last several years, the useful definition of a computer has become more broadly understood to include mobile phones, tablet computers, laptops, desktops, and similar. For example, Microsoft®, have attempted to merge devices such as a tablet computer and a laptop computer with the release of "Windows® 8" as well as subsequent releases of that operating system.

In one embodiment, said one or more computers 1906 each can include, but is not limited to, a laptop or desktop (such as said personal computer 2100b), desktop, workstation, server, mainframe, terminal, a tablet (such as said tablet computer 2100c), a phone (such as said mobile phone 2100a), said wearable computer 2100d, and/or similar. Despite different form-factors, said one or more computers 1906 can have similar basic hardware, such as a screen 2102 and a one or more input devices 2104 (such as a keyboard 2104a, a trackball 2104b, a one or more cameras 2104c, a wireless—such as RFID—reader, a track pad 2104d, and/or a home button 2120). In one embodiment, said screen 2102 can comprise a touch screen. In one embodiment, said track pad 2104d can function similarly to a computer mouse as is known in the art.

In one embodiment, said tablet computer 2100c and/or said personal computer 2100b can comprise a Microsoft® Windows® branded device, an Apple® branded device, or similar. In one embodiment, said tablet computer 2100c can be an X86 type processor or an ARM type processor, as is known in the art.

Said network diagram 1902 can transmit said data 2106. In one embodiment, said data 2106 can comprise data related to said safety monitoring harness system 200.

In one embodiment, said one or more computers 1906 can be used to input and view said data 2106. In one embodiment, said data 2106 can be input into said one or more computers 1906 by taking pictures with a camera, by typing in information with said keyboard 2104*a*, or by using gestures on said screen 2102 (where said screen 2102 is a touch screen). Many other data entry means for devices like said one or more computers 1906 are well known and herein also possible with data 2106. In one embodiment, said first computer 1906*a* can comprise an iPhone®, a BlackBerry®, a smartphone, or similar. In one embodiment, one or more computers 1906 can comprise a laptop computer, a desktop computer, or similar.

Figure 22A:
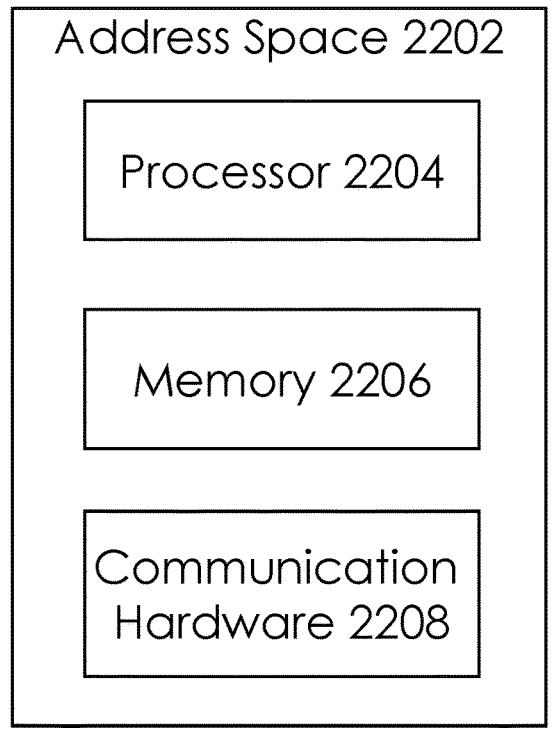
FIG. 22A illustrates view of address space 2200.
Figure 22B:
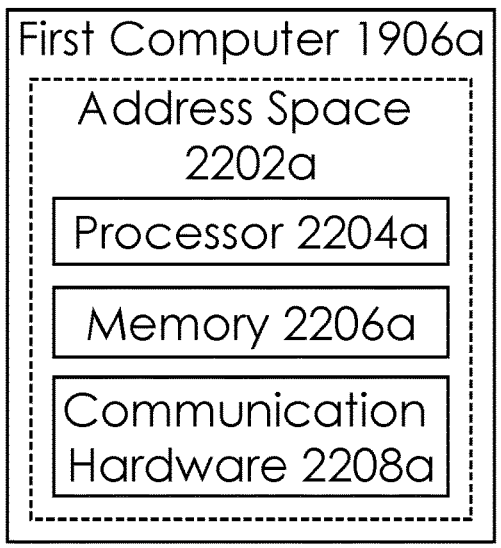
FIG. 22B illustrates view of address space 2200*a*.
Figure 22C:
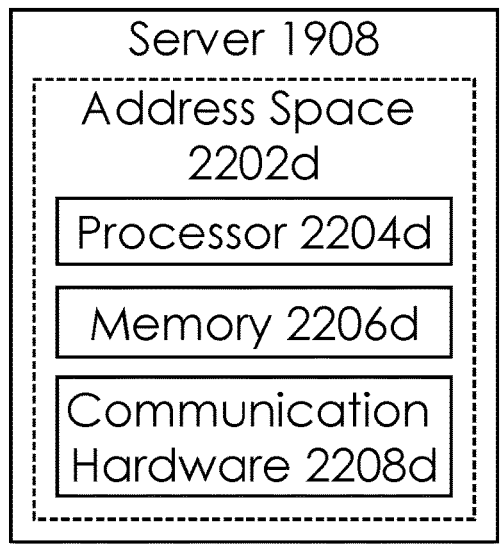
FIG. 22C illustrates view of address space 2200*d*.

FIG. 22A illustrates view of address space 2200.
FIG. 22B illustrates view of address space 2200*a*.
FIG. 22C illustrates view of address space 2200*d*.

In one embodiment, said address space 2200 can comprise said processor 2202, said memory 2204 and said communication hardware 2206.

In one embodiment, said first computer 1906*a* can comprise said address space 2200*a*, said processor 2202*a*, said memory 2204*a* and said communication hardware 2206*a*.

In one embodiment, said server 1908 can comprise said address space 2200*d*, said processor 2202*d*, said memory 2204*d* and said communication hardware 2206*d*.

For discussion purposes, said one or more computers 1906 and said server 1908 are simplified into the component parts of said processor 2202 herein.

Figure 23:
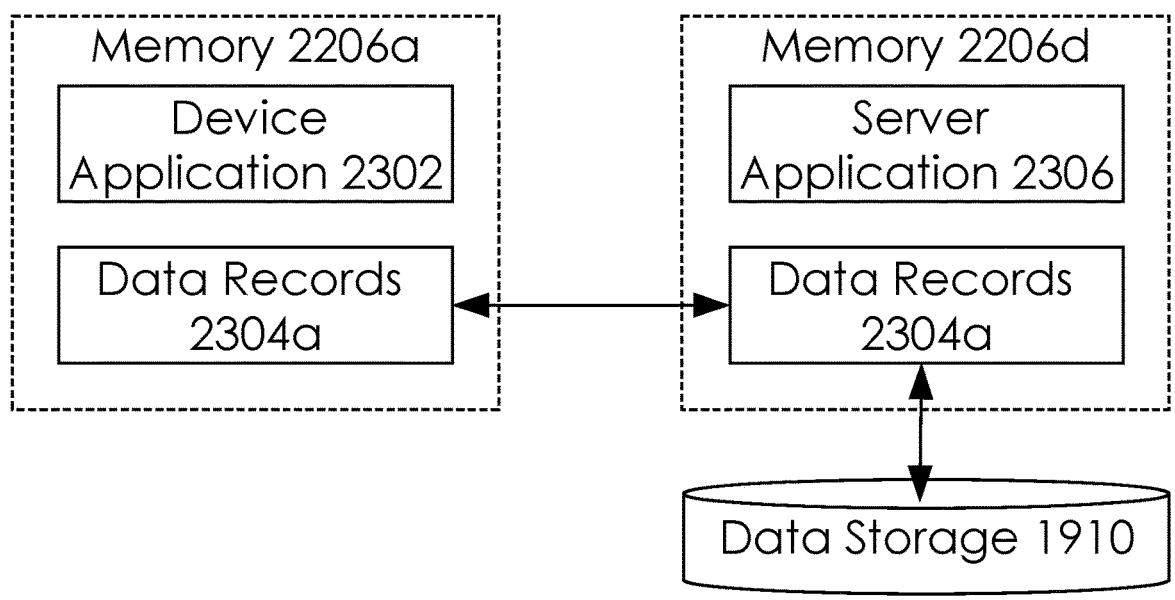
FIG. 23 illustrates device application 2302 and server application 2306.

FIG. 23 illustrates device application 2302 and server application 2306.

In one embodiment, said address space 2200*a* can comprise said device application 2302 and said data records 2304*a*.

In one embodiment, said address space 2200*d* can comprise said data records 2304*b* and said server application 2306.

In one embodiment, said communication hardware 2206*a* and said communication hardware 2206*d* can send and receive data to and from one another and or can communicate with said data storage 1910 across said network 1912.

In one embodiment, said safety monitoring harness system 200 can comprise said device application 2302 being located partially in said safety monitoring harness system 200, and possibly partially in said first computer 1906*a*. Said safety monitoring harness system 200 can further comprise said server application 2306 being hosted in said server 1908. In one embodiment, said safety monitoring harness system 200 can comprise additional functionality by monitoring and logging activities by said climber 1622 in the cloud/on a server.

Accordingly, said data storage 1910 can comprise records related to one or more of said climber 1622.

In one embodiment, said server 1908 can comprise a third party data storage and hosting provider or privately managed as well.

In one embodiment, said safety monitoring harness system 200 can operate without a data connection out to said server 1908 by creating alarm conditions for use by said climber 1622 without reporting or consulting with said server application 2306.

Figure 24:
FIG. 24 illustrates said tether status table 2400.

FIG. 24 illustrates said tether status table 2400.

In one embodiment, said tether status table 2400 can comprise said number of markers 2402*a*, said strap length 2402*b*, said current movement 2402*c*, said last movement 2402*d*, said number markers outside of case 2402*e*, said absolute velocity average last minute 2402*f*, said absolute velocity average last minute 2402*f* and said plurality of tethers status records 2404.

In one embodiment, said plurality of tethers status records 2404 can comprise said first tether status record 2404*a* and said second status record 2404*b*.

In one embodiment, said data records 2304*a* can comprise said tether status table 2400.

In one embodiment, said tether status table 2400 can comprise a current status table/class related to said one or more tether assemblies 804. Said plurality of tethers status records 2404 can comprise one record per tether among said one or more tether assemblies 804. In one embodiment, number of markers 2402*a* can comprise a number of said plurality of strap markers 1812 on said strap 1106; said strap length 2402*b* can comprise a total length of said strap 1106; said current movement 2402*c* can comprise a calculation as written in said length monitoring method flow chart 1404; said last movement 2402*d* can comprise a timer back to the last measured movement in said strap 1106; said number markers outside of case 2402*e* can comprise a count of the number of said plurality of strap markers 1812 being outside of said two or more strap apertures 400; and said absolute velocity average last minute 2402*f* can comprise a calculation of the change in position (said strap length 2402*b*) over the last minute to determine the amount of movement over a period of time. In one embodiment, said absolute velocity average last minute 2402*f* can comprise a measurement over a period different than one minute as required for design preferences.

FIG. 25A illustrates said tether log table 2500.
FIG. 25B illustrates said strap length chart 2508.
FIG. 25C illustrates said falling illustration 2506.

In one embodiment, said tether log table 2500 can comprise said tether record fields 2502, said exemplary data for first tether 2504*a* and said strap length chart 2508.

In one embodiment, said tether record fields 2502 can comprise said tether ID field 2502*a*, said time reading field 2502*b*, said time field 2502*c*, said time base zero field 2502*d*, said strap length field 2502*e* and said markers outside field 2502*f*.

In one embodiment, said safety monitoring harness system 200 can calculate the event of a free fall of said climber 1622 as opposed to a smaller acceleration event. For example, in one embodiment, said safety monitoring harness system 200 can comprise a one or more data logs including said tether log table 2500. In one embodiment, said safety monitoring harness system 200 can track a status of each of said one or more tether assemblies 804 the course of a usage period.

In one embodiment, said tether log table 2500 can comprise data related to said base 100 over time. Said exemplary data for first tether 2504*a* can comprise a reference to one among said one or more tether assemblies 804. Said time reading field 2502*b* can comprise a time of a log entry. In one embodiment, sensitivity and frequency of data collection can be increased to improve fidelity of said safety monitoring harness system 200 and is predictions. In one embodiment, said time field 2502*c* and said time base zero field 2502*d* can comprise calculations based on said time reading field 2502*b* so as to calculate rates of change in the remaining fields. In one embodiment, said strap length field 2502*e* can comprise a length of said strap 1106, as discussed above. In one embodiment, said markers outside field 2502*f* can comprise a number of said plurality of strap markers 1812 being outside of said base 100.

In one embodiment, said safety monitoring harness system 200, can calculate acceleration and velocity of said climber 1622 so as to predict the state of said climber 1622 at a given time. In one embodiment, if said safety monitoring harness system 200 is accelerating at 9.8 m/s^2, it can be concluded that said climber 1622 is in freefall. Herein, for illustrative purposes, said safety monitoring harness system 200 is accelerating at the rate of gravitational acceleration (although this illustration assumes no wind resistance and a free fall straight down). It is further noted that said safety monitoring harness system 200 stops at exactly 5.0 meters, which is the hypothetical maximum length of said strap 1106. Having established that said safety monitoring harness system 200 has stopped at approximately the full length of said strap 1106, said safety monitoring harness system 200 can further calculate that said climber 1622 is safely dangling from said anchor point 1702. This is scenario is illustrated in FIG. 25C and said falling illustration 2506.

FIG. 26 illustrates said supervisor status table 2600.

In one embodiment, said supervisor status table 2600 can comprise said user ID field 2602, said location field 2604, said time up field 2606, said percent tied off field 2608, said current status field 2610, said current status field 2610 and said one or more climbers monitored 2612.

In one embodiment, said one or more climbers monitored 2612 can comprise said first climbers monitored 2612a, said second climbers monitored 2612b, said third climbers monitored 2612c and said fourth climbers monitored 2612d.

In one embodiment, said supervisor status table 2600 can comprise a table calculated in said server application 2306 on said server 1908. In one embodiment, a one or more of said climber 1622 can communicate portions of said tether status table 2400 and said tether log table 2500 to said server 1908 and said server application 2306 can summarize a status of such users for said supervisor 1624.

In one embodiment, said user ID field 2602 can comprise an identifier to a one or more of said climber 1622 assigned to said supervisor 1624; said location field 2604 can comprise a short hand calculation of the user's location; said time up field 2606 can comprise a calculation of how much time the user has been in an unsafe zone for a given period (such as during the same calendar day or last 24 hours); said percent tied off field 2608 can comprise a calculation of the users' success in remaining tied off while in danger; and said current status field 2610 can comprise a current bottom line safety calculation.

FIG. 27 illustrates said climber status table 2700.

In one embodiment, said climber status table 2700 can comprise said user ID field 2702, said first tether status field 2704, said second tether status field 2706, said safety status field 2708, said event time field 2710, said exemplary climber records 2712a and said state period field 2714.

Said climber status table 2700 can comprise a log of records of pertaining to a user of said safety monitoring harness system 200 with regard to said safety arming and monitoring method 1500. Wherein, said user ID field 2702 can comprise a reference to a particular user; said first tether status field 2704 can comprise a record of the status of said first tether assembly 804a; said second tether status field 2706 can comprise a record of the status of said second tether assembly 804b; said safety status field 2708 can comprise a status change at a particular time; said event time field 2710 can comprise the time and date (showing only time in the illustration, but would include date in an embodiment); and said state period field 2714 can comprise a calculation of how long an unsafe condition existed.

Figure 28A:
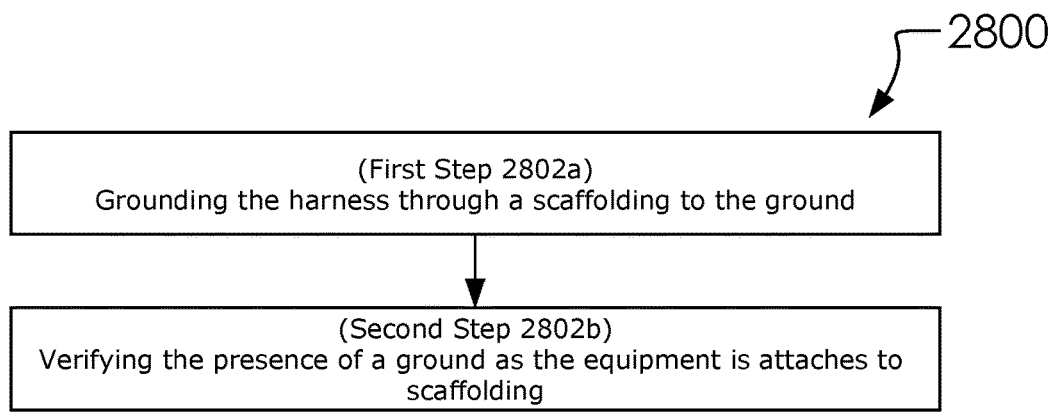
FIG. 28A illustrates said grounding calculation method 2800.

FIG. 28A illustrates said grounding calculation method 2800.

Figure 28B:
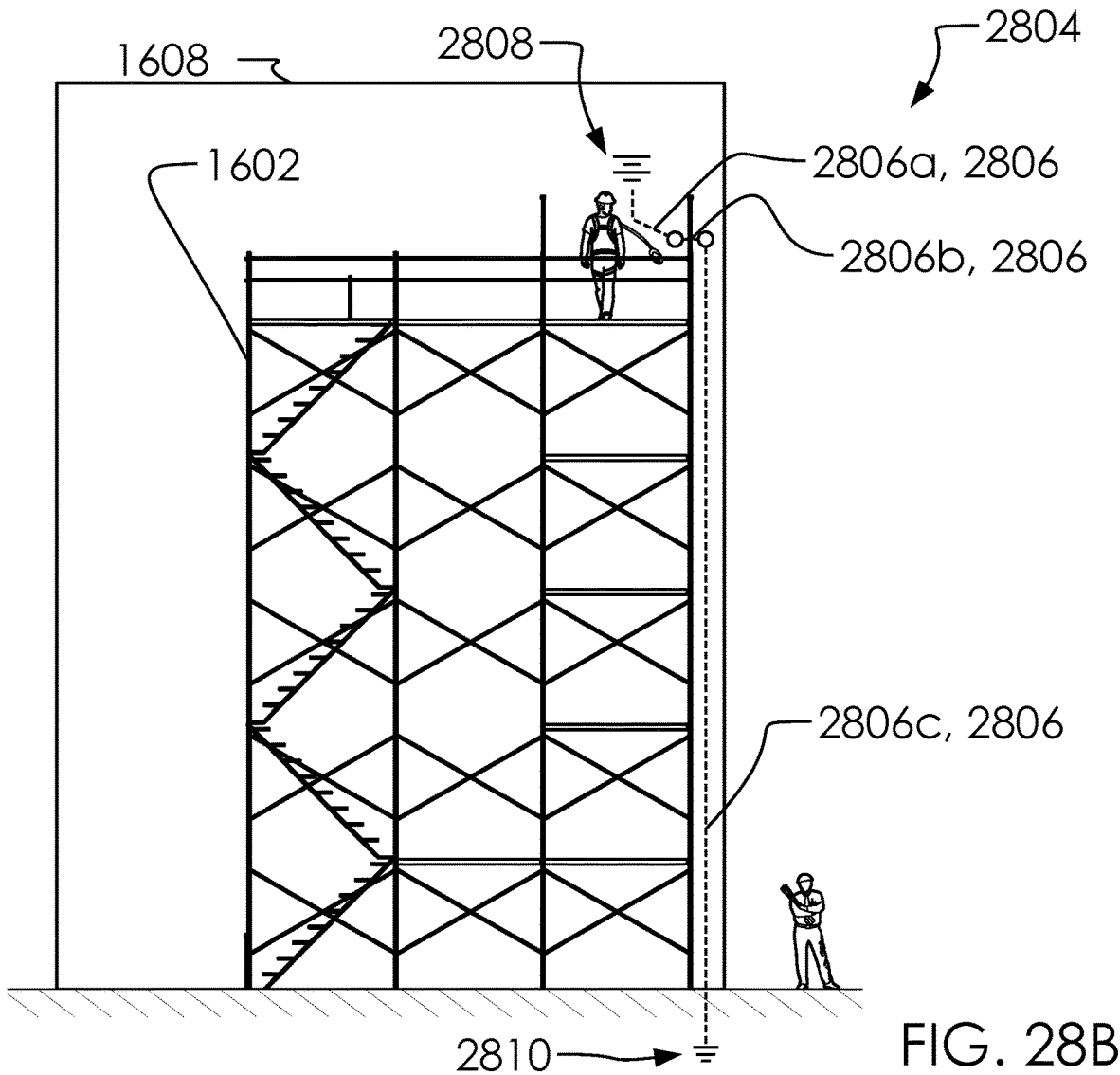
FIG. 28B illustrates elevated front view of grounding diagram 2804.

FIG. 28B illustrates elevated front view of grounding diagram 2804.

In one embodiment, said grounding calculation method 2800 can comprise said verifying ground step 2802a and said grounding step 2802a.

In one embodiment, said grounding diagram 2804 can comprise said grounding diagram 2804, said one or more ground paths 2806, said attachment point 2808 and said ground 2810.

In one embodiment, said one or more ground paths 2806 can comprise said first ground path 2806a, said second ground path 2806b and said third ground path 2806c.

In one embodiment, said ground test circuit 1306 of said safety monitoring harness system 200 can comprise tracing a ground path from said safety monitoring harness system 200 to said ground 2810. For this system to function, said safety monitoring harness system 200 must be attached to a grounded structure. By this method, said safety monitoring harness system 200 can calculate whether one or more of said one or more tether assemblies 804 are attached to said scaffolding 1602 or not at any given time.

FIG. 29A illustrates said proximity sensing method 2900.

FIG. 29B illustrates an elevated front side view of proximity safety zone illustration 2904.

In one embodiment, said proximity sensing method 2900 can comprise said installing proximity antenna steps 2902a and said monitoring proximity steps 2902b.

In one embodiment, said proximity safety zone illustration 2904 can comprise said proximity safety zone illustration 2904, said plurality of proximity antennas 2906 and said plurality of antenna distances 2910.

In one embodiment, said plurality of proximity antennas 2906 can comprise said first proximity antenna 2906a, said second proximity antenna 2906b, said third proximity antenna 2906c, said fourth proximity antenna 2906d, said fifth proximity antenna 2906e, said sixth proximity antenna 2906f, said seventh proximity antenna 2906g and said eighth proximity antenna 2906h.

In one embodiment, said plurality of antenna distances 2910 can comprise said first antenna distance 2910a, said second antenna distance 2910b and said third antenna distance 2910c.

In one embodiment, said proximity sensor system 1316 can be configured to sense said plurality of antenna distances 2910 between said proximity sensor system 1316 and a portion of said plurality of proximity antennas 2906 to determine the location of said safety monitoring harness system 200. Once a location of said base 100 is determined, said safety monitoring harness system 200 can determine whether said climber 1622 is in said unsafe zone 1614 or said safe zone 1620. Said safety monitoring harness system 200 can calculate the location of said base 100 using triangulation or other location calculating means, as is known in the art.

Figure 30A:
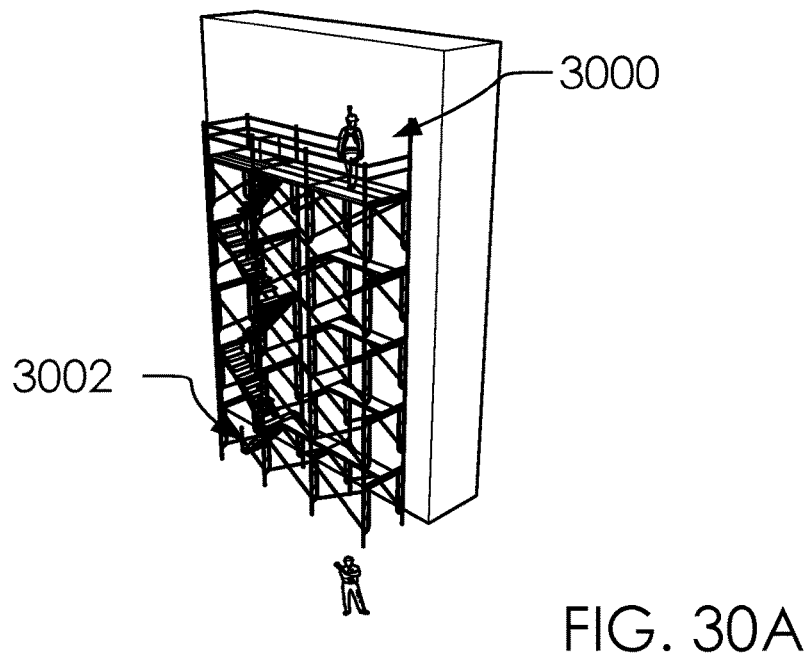
FIG. 30A illustrates a perspective overview view of worksite 1600.

FIG. 30A illustrates a perspective overview view of worksite 1600.

Figure 30B:
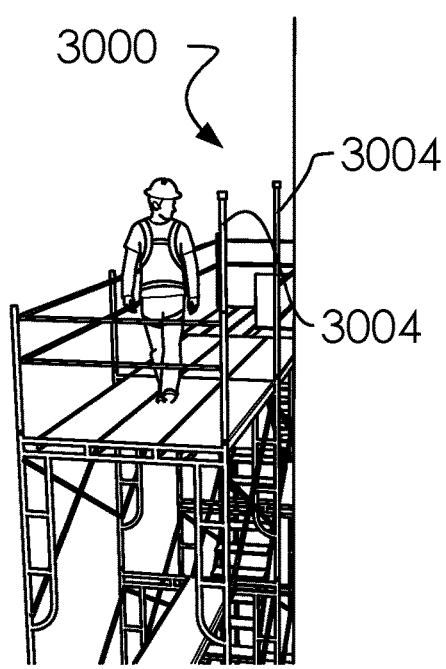
FIG. 30B illustrates a perspective overview view of safe zone exit 3000.

FIG. 30B illustrates a perspective overview view of safe zone exit 3000.

Figure 30C:
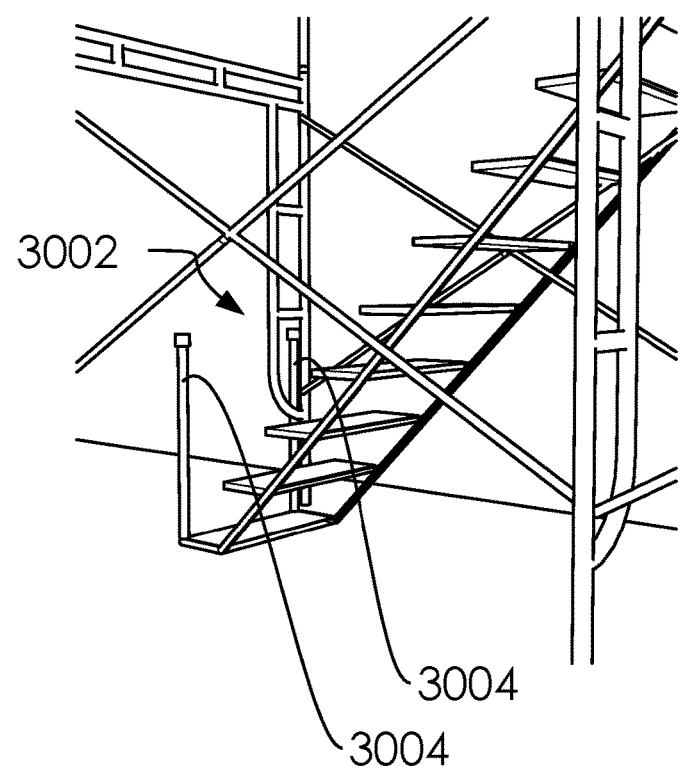
FIG. 30C illustrates a perspective overview view of safe zone entry 3002.

FIG. 30C illustrates a perspective overview view of safe zone entry 3002.

In one embodiment, said safe zone exit 3000 can comprise said entry and exit sensors 3004.

In one embodiment, said safe zone entry 3002 can comprise said entry and exit sensors 3004.

In one embodiment, said worksite 1600 can comprise said safe zone exit 3000 and said safe zone entry 3002.

In one embodiment, said entry and exit sensors 3004 can signal an entry and exit event from said safe zone 1620. Wherein, said safety monitoring harness system 200 can communicate with said entry and exit sensors 3004 to measure an entrance or exit event. In one embodiment, said safety monitoring harness system 200 and entry and exit sensors 3004 can communicated using RF, as is known in the art.

Figure 31A:
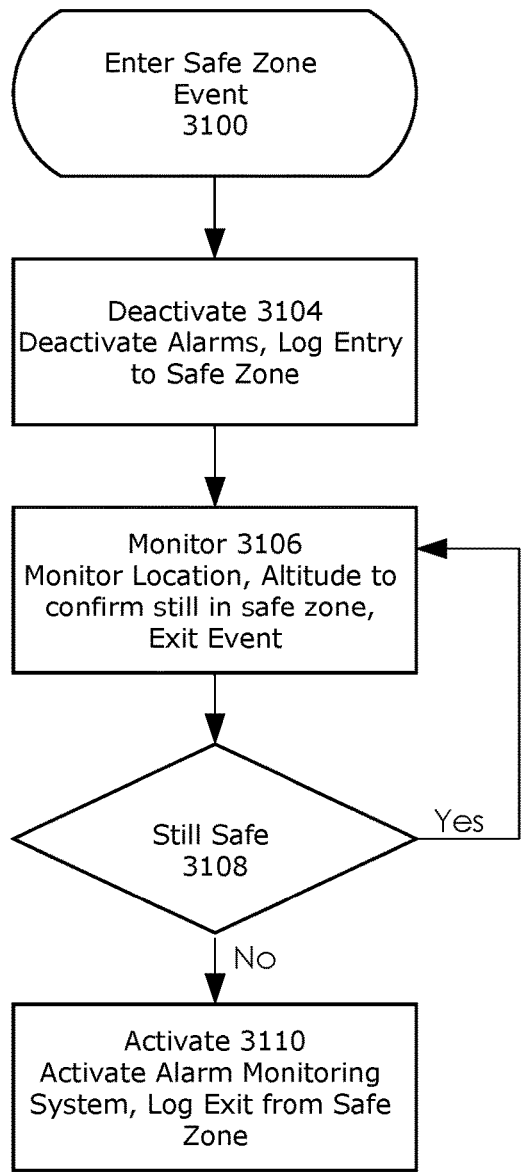
FIG. 31A illustrates view of enter safe zone event 3100.

FIG. 31A illustrates view of enter safe zone event 3100.

Figure 31B:
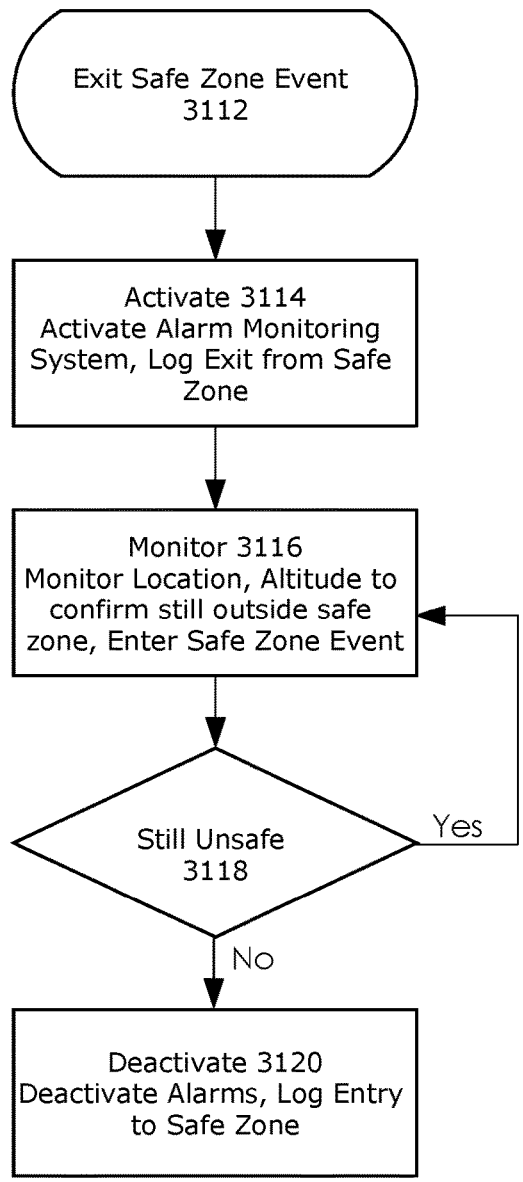
FIG. 31B illustrates view of exit safe zone event 3112.

FIG. 31B illustrates view of exit safe zone event 3112.

In one embodiment, said one or more mag reed switches 112 can comprise said deactivation step 3120.

In one embodiment, said safety monitoring harness system 200 can be configured to assess safety of users using said safe zone exit 3000, safe zone entry 3002, entry and exit sensors 3004 and said altimeter 114, as discussed herein.

Figure 32:
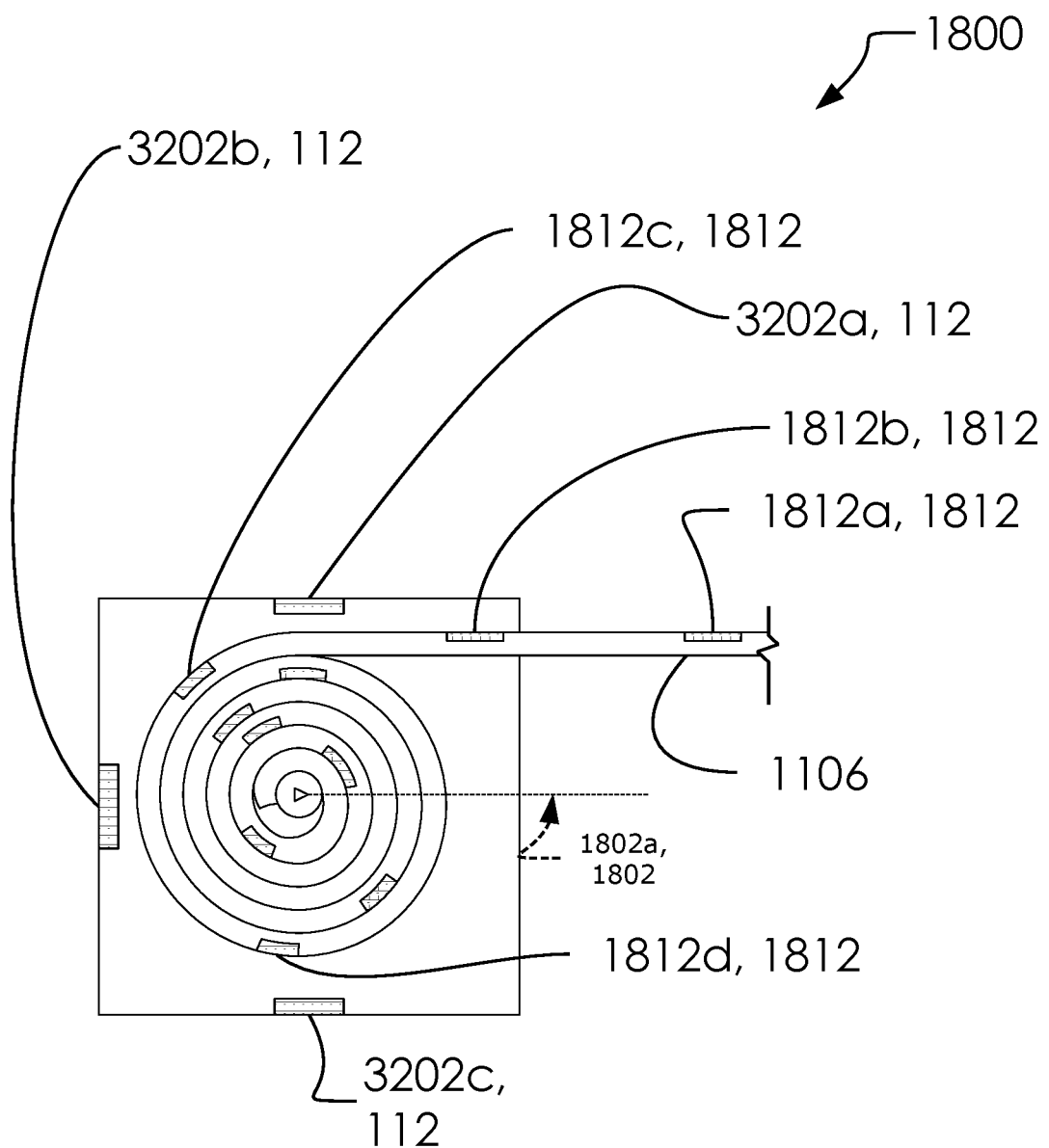
FIG. 32 illustrates an elevated front side view of strap 1106.

FIG. 32 illustrates an elevated front side view of strap 1106.

In one embodiment, said one or more side switches 3202 can comprise said first side switch 3202a, said second side switch 3202b and said third side switch 3202c.

In one embodiment, said one or more mag reed switches 112 can comprise said one or more side switches 3202.

In one embodiment, said one or more mag reed switches 112 can comprise said 3safety monitoring harness system 200; wherein said safety monitoring harness system 200 can measure movement of said strap 1106 by collecting signals from said plurality of strap markers 1812 at various points along a rotary path. In this configuration, fewer of said plurality of strap markers 1812 may be required. In one embodiment, said mag reed switches 112 can be configured to sense pressure from said plurality of strap markers 1812 as they move past said mag reed switches 112 to determine movement in said strap 1106.

In one embodiment, said plurality of strap markers 1812 can be incorporated within said strap 1106, as illustrated. This can be asserted with the figures in said plurality of retraction stages 1800 as well.

Figure 33:
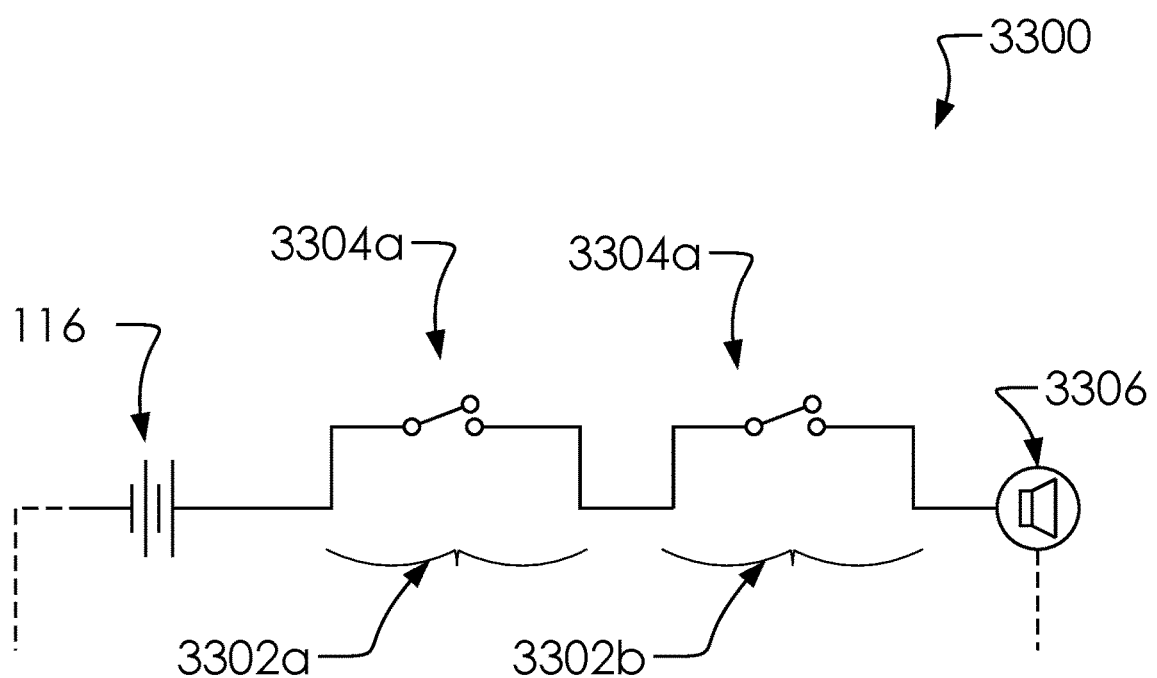
FIG. 33 illustrates an analog circuit configuration 3300.

FIG. 33 illustrates an analog circuit configuration 3300.

In one embodiment, said analog circuit configuration 3300 can comprise said battery assembly 116, a first gate circuit 3302a, a second gate circuit 3302b, a first gate 3304a, a second gate 3304b and an alarm 3306. In one embodiment, said first gate circuit 3302a can comprise said first gate 3304a; and said second gate circuit 3302b can comprise said second gate 3304b.

In one embodiment, said analog circuit configuration 3300 can trip when said first gate 3304a and said second gate 3304b are both closed. In one embodiment, said first gate 3304a and said second gate 3304b can become closed when both of said first mag reed switch 112a and said second mag reed switch 112b are closed with respect to said strap 1106.

Accordingly, said safety monitoring harness system 200 can comprise an analog configuration, wherein said alarm system 218 is triggered when both of said one or more tether assemblies 804 are in said retracted configuration 1200a.

The following sentences are included for completeness of this disclosure with reference to the claims.

A safety monitoring harness system 200 for the protection of a climber 1622 comprising: said safety monitoring harness system 200 comprising a base 100, a one or more tether assemblies 804, a retraction assembly 124, an alarm system 218, a strap length sensor assembly 220, and a power system 1308. Said one or more tether assemblies 804 comprising at least a first tether assembly 804a and a second tether assembly 804b. Said one or more tether assemblies 804 each comprising a strap 1106, and an anchoring hook 1102. Said safety monitoring harness system 200 is configured to selectively attach to said climber 1622 by: attaching a harness assembly 802 to said climber 1622, and securing said base 100 to said harness assembly 802. A portion of said retraction assembly 124 is enclosed within said base 100. Said retraction assembly 124 are configured to selectively retract and release portions of said strap 1106 from within said base 100. Said base 100 tracks the position of said one or more tether assemblies 804 by measuring portions of said strap 1106 inside and outside of said base 100. Said anchoring hook 1102 selectively retract and extend between a plurality of lengths 1202. Said plurality of lengths 1202 comprise at least a retracted length 1202a and a fully extended length 1202c. Said anchoring hook 1102 are configured to selectively attach to an anchor point 1702. Said safety monitoring harness system 200 is configured to measure the movement of said strap 1106 by measuring movement of a plurality of strap markers 1812 relative to a one or more mag reed switches 112. Said safety monitoring harness system 200 is configured to monitor use of said one or more tether assemblies 804 by said climber 1622 by: monitoring a change in the position of said one or more tether assemblies 804 over time, verifying that at least one among said one or more tether assemblies 804 is extended, and verifying that at least one among said one or more tether assemblies 804 which is extended is showing movement rather than a fixed length. A safety monitoring harness system 200 for the protection of a climber 1622 comprising:

Said safety monitoring harness system 200 comprising a base 100, a one or more tether assemblies 804, a retraction assembly 124, an alarm system 218, a strap length sensor assembly 220, and a power system 1308. Said one or more tether assemblies 804 comprising at least a first tether assembly 804a and a second tether assembly 804b. Said one or more tether assemblies 804 each comprising a strap 1106, and an anchoring hook 1102. Said safety monitoring harness system 200 is configured to selectively attach to said climber 1622 by: attaching a harness assembly 802 to said climber 1622, and securing said base 100 to said harness assembly 802. A portion of said retraction assembly 124 is enclosed within said base 100. Said retraction assembly 124 are configured to selectively retract and release portions of said strap 1106 from within said base 100. Said anchoring hook 1102 selectively retract and extend between a plurality of lengths 1202. Said plurality of lengths 1202 comprise at least a retracted length 1202a and a fully extended length 1202c. Said anchoring hook 1102 of said one or more tether assemblies 804 are configured to selectively attach to an anchor point 1702. Said safety monitoring harness system 200 is configured to monitor use of said one or more tether assemblies 804 by said climber 1622 by: verifying that at least one among said one or more tether assemblies 804 is extended.

Each of said strap 1106 comprise at least a first strap marker 1812a. Said first strap marker 1812a are configured to align with a portion of a one or more mag reed switches 112 when said strap 1106 is in said retracted length 1202a and not aligned when said strap 1106 is not in said retracted length 1202a. Said safety monitoring harness system 200 is configured to verify that at least one of said one or more tether assemblies 804 are deployed by: measuring whether at least one of said strap 1106 are not in said retracted length 1202a.

Said safety monitoring harness system 200 further comprising a PCB 106 and an altimeter 114. Said PCB 106 comprising a processors 214 and a memory 202. Said safety monitoring harness system 200 is configured to monitor the safety of a user by: activating said safety monitoring harness system 200, calculating an initialization altitude using said altimeter 114 at the time of activation, monitoring said altimeter 114, determining whether said safety monitoring harness system 200 is more than a safe distance above said initialization altitude according to user preference.

Said safety monitoring harness system 200 further comprising a PCB 106. Said PCB 106 comprising a processors 214 and a memory 202.

Said strap 1106 each comprise a plurality of strap markers 1812 being attached to said strap 1106 at a marker interval 1804 between each among said plurality of strap markers 1812. Said base 100 further comprises a one or more mag reed switches 112 configured to sense movement of said plurality of strap markers 1812 as said strap 1106 rotates past said one or more mag reed switches 112. Said one or more mag reed switches 112 comprise at least a first mag reed switch 112a for said strap 1106 of said first tether assembly 804a and a second mag reed switch 112b for said strap 1106 of said second tether assembly 804b.

Said safety monitoring harness system 200 is configured to calculate a safety status of said climber 1622 by: receiving a length signal regarding said one or more tether assemblies 804, comparing said length signals, calculating whether at least one among said one or more tether assemblies 804 is extended out of said base 100, calculating an unsafe status if at least one among said one or more tether assemblies 804 is moving outside of said base 100 for a given period, and otherwise setting status to safe.

Said safety monitoring harness system 200 is configured to trigger an alarm if said climber 1622 is not in a safe condition as defined by at least one among said one or more tether assemblies 804 be extended and moving.

Said strap 1106 each comprise a plurality of strap markers 1812 being attached to said strap 1106 at a marker interval 1804 between each among said plurality of strap markers 1812. Said base 100 further comprises a one or more mag reed switches 112 configured to sense movement of said plurality of strap markers 1812 as said strap 1106 rotates past said one or more mag reed switches 112. Said one or more mag reed switches 112 comprise at least a first mag reed switch 112a for said strap 1106 of said first tether assembly 804a and a second mag reed switch 112b for said strap 1106 of said second tether assembly 804b.

Said base 100 tracks the position of said one or more tether assemblies 804 by measuring portions of said strap 1106 inside and outside of said base 100. Said safety monitoring harness system 200 is configured to measure the movement of said strap 1106 by measuring movement of a plurality of strap markers 1812 relative to a one or more mag reed switches 112.

Said retraction assembly 124 each comprise a one or more pin catches 500. Said base 100 comprises a one or more key locks 108. Said one or more key locks 108 comprise a pins 508. Said one or more key locks 108 can be selectively arranged between an unlocked configuration 502a and a locked configuration 502b. Said pins 508 selectively prevent said retraction assembly 124 from rotating and releasing said one or more tether assemblies 804 with said retraction assembly 124 in said locked configuration 502b.

Said safety monitoring harness system 200 further comprises a device application 2302 and a server application 2306. Said device application 2302 is executed on a first computer 1906a associated with said climber 1622. Said server application 2306 is executed on a server 1908. A one or more computers 1906 and said server 1908 are in data communication with one another. Said device application 2302 reports safety status of said climber 1622 to said server application 2306. Said server application 2306 reports on one or more of said climber 1622 to a one or more users 1916 such as a supervisor 1624.

Said server application 2306 comprises software for matching one or more of said climber 1622 with said supervisor 1624. Said server application 2306 reports a supervisor status table 2600 summarizing a tether status table 2400 for each among said climber 1622.

Said safety monitoring harness system 200 is configured to calculate a safety status of said climber 1622 by: receiving a length signal regarding said one or more tether assemblies 804, comparing said length signals, calculating whether at least one among said one or more tether assemblies 804 is extended out of said base 100, calculating an unsafe status if at least one among said one or more tether assemblies 804 is moving outside of said base 100 for a given period, and otherwise setting status to safe.

Said safety monitoring harness system 200 is further configured for: signaling an alarm if said climber 1622 is in an unsafe status, and reassessing the safety status of said climber 1622 in order to reset the alarm.

Said strap 1106 each comprise a plurality of strap markers 1812 being attached to said strap 1106 at a marker interval 1804 between each among said plurality of strap markers 1812. Said base 100 further comprises a one or more mag reed switches 112 configured to sense movement of said plurality of strap markers 1812 as said strap 1106 rotates past said one or more mag reed switches 112. Said one or more mag reed switches 112 comprise at least a first mag reed switch 112a for said strap 1106 of said first tether assembly 804a and a second mag reed switch 112b for said strap 1106 of said second tether assembly 804b.

Said safety monitoring harness system 200 is configured to trigger an alarm if said climber 1622 is not in a safe condition as defined by at least one among said one or more tether assemblies 804 be extended and moving.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A safety monitoring harness system for the protection of a climber comprising:
    said safety monitoring harness system comprising a base, a one or more tether assemblies, a retraction assembly, an alarm system, a strap length sensor assembly, and a power system;
    said one or more tether assemblies each comprise a strap, and an anchoring hook;

said safety monitoring harness system is configured to selectively attach to said climber by:
  securing a harness assembly to said climber, and
  securing said base to said harness assembly;
a portion of said retraction assembly is enclosed within said base;
said anchoring hook retract and extend between a plurality of lengths from said base;
said plurality of lengths for each of said anchoring hooks comprise at least a retracted length and a fully extended length;
said safety monitoring harness system is configured to monitor use of said one or more tether assemblies by said climber by
  verifying that at least one among said one or more tether assemblies is extended;
each of said straps comprise at least a first strap marker;
said safety monitoring harness system further comprises a one or more mag reed switches;
said first strap marker, for each of said strap, is configured to align with a portion of a one or more mag reed switches when said strap is in said retracted length and not aligned when said strap is not in said retracted length;
wherein verifying that at least one among said one or more tether assemblies is extended comprises
  measuring whether at least one of said strap are not in said retracted length by verifying that at least one among said one or more one or more mag reed switches is not aligned with said first strap marker;
said safety monitoring harness system comprises an analog circuit configuration comprising a circuit between said power system and said alarm system;
said analog circuit configuration comprises a gate circuit for each of said one or more tether assemblies between said battery assembly and said alarm system; and
said gate circuit are each configured as closed with said first strap marker aligned with a first mag reed switch and said strap in said retracted length.

2. A safety monitoring harness system for the protection of a climber comprising:
said safety monitoring harness system comprising a base, a one or more tether assemblies, a retraction assembly, an alarm system, a strap length sensor assembly, and a power system;
said one or more tether assemblies each comprise a strap, and an anchoring hook;
said safety monitoring harness system is configured to selectively attach to said climber by:
  securing a harness assembly to said climber, and
  securing said base to said harness assembly;
a portion of said retraction assembly is enclosed within said base;
said anchoring hook retract and extend between a plurality of lengths from said base;
said plurality of lengths for each of said anchoring hooks comprise at least a retracted length and a fully extended length;
said safety monitoring harness system is configured to monitor use of said one or more tether assemblies by said climber by
  verifying that at least one among said one or more tether assemblies is extended;
each of said straps comprise at least a first strap marker;
wherein verifying that at least one among said one or more tether assemblies is extended comprises
  measuring whether at least one of said strap are not in said retracted length by verifying that at least one among said one or more one or more mag reed switches is not aligned with said first strap marker;
said safety monitoring harness system comprises an analog circuit configuration comprising a circuit between said power system and said alarm system;
said analog circuit configuration comprises a gate circuit for each of said one or more tether assemblies between said battery assembly and said alarm system; and
said gate circuit are each configured as closed with said first strap marker aligned with a first mag reed switch and said strap in said retracted length.

* * * * *